US012042681B2

(12) United States Patent
Feenstra et al.

(10) Patent No.: US 12,042,681 B2
(45) Date of Patent: Jul. 23, 2024

(54) FIRE SUPPRESSION SYSTEM AND METHOD FOR A HELICOPTER LANDING PAD

(71) Applicant: Minimax Viking Research & Development GmbH, Bad Oldesloe (DE)

(72) Inventors: Shawn J. Feenstra, Caledonia, MI (US); Derek J. Scheffers, Mattawan, MI (US)

(73) Assignee: Minimax Viking Research & Development GmbH, Bad Oldesloe (DE)

(*) Notice: Subject to any disclaimer, the term of this patent is extended or adjusted under 35 U.S.C. 154(b) by 375 days.

(21) Appl. No.: 17/296,755

(22) PCT Filed: Nov. 25, 2019

(86) PCT No.: PCT/US2019/063004
§ 371 (c)(1),
(2) Date: May 25, 2021

(87) PCT Pub. No.: WO2020/112632
PCT Pub. Date: Jun. 4, 2020

(65) Prior Publication Data
US 2022/0023691 A1 Jan. 27, 2022

Related U.S. Application Data

(60) Provisional application No. 62/771,244, filed on Nov. 26, 2018, provisional application No. 62/829,751, filed on Apr. 5, 2019.

(51) Int. Cl.
*A62C 31/12* (2006.01)
*A62C 3/08* (2006.01)
(Continued)

(52) U.S. Cl.
CPC ................ *A62C 31/12* (2013.01); *A62C 3/08* (2013.01); *A62C 5/022* (2013.01); *A62C 31/03* (2013.01)

(58) Field of Classification Search
CPC ........... A62C 31/12; A62C 3/08; A62C 5/022; A62C 31/03
(Continued)

(56) References Cited

U.S. PATENT DOCUMENTS 1,896,072 A 10/1931 Hamilton
2,059,190 A 11/1936 Allen
(Continued)

OTHER PUBLICATIONS

International Searching Authority, International Search Report and Written Opinion in International Appln. No. PCT/US2019/063004, Feb. 6, 2020, 12 pages.
(Continued)

*Primary Examiner* — Christopher S Kim
(74) *Attorney, Agent, or Firm* — Perkins Coie LLP

(57) ABSTRACT

A helipad fire suppression system includes a helipad having an outer boundary that defines an impervious deck area for at least one of landing or storing one or more helicopters, with at least a portion of the impervious deck area being designated a fire suppression target area. The system includes a nozzle assembly having a spray-type nozzle for spraying a fire suppression fluid in a radial pattern. The nozzle assembly can include a nozzle enclosure for enclosing the spray-type nozzle and can be configured for installation in a surface made of an impervious material. The nozzle assembly is disposed in an interior portion of the impervious deck area so as to provide the fire suppression fluid to the fire suppression target area.

21 Claims, 15 Drawing Sheets

(51) Int. Cl.
*A62C 5/02* (2006.01)
*A62C 31/03* (2006.01)

(58) Field of Classification Search
USPC .......................................... 239/201, 202–206
See application file for complete search history.

(56) References Cited

U.S. PATENT DOCUMENTS

| | | | | | |
|---|---|---|---|---|---|
| 3,583,637 | A | | 6/1971 | Miscovich | |
| 3,713,492 | A | | 1/1973 | Forrest | |
| 3,749,314 | A | * | 7/1973 | Robinson | E02F 7/10 239/206 |
| 4,429,832 | A | * | 2/1984 | Sheets | B05B 15/74 239/288.5 |
| 4,657,086 | A | | 4/1987 | Aanensen | |
| 5,113,945 | A | | 5/1992 | Cable | |
| 5,382,389 | A | | 1/1995 | Goodine et al. | |
| 5,538,027 | A | | 7/1996 | Adamson et al. | |
| 5,848,752 | A | | 12/1998 | Kolacz et al. | |
| 5,971,297 | A | | 10/1999 | Sesser | |
| 6,047,897 | A | | 4/2000 | Ueno et al. | |
| 6,182,767 | B1 | | 2/2001 | Jackson | |
| 6,383,608 | B1 | | 5/2002 | Burkett et al. | |
| 6,481,644 | B1 | | 11/2002 | Olsen | |
| 9,155,926 | B2 | | 10/2015 | Mason | |
| D813,349 | S | | 3/2018 | Rudrapada et al. | |
| 11,364,399 | B2 | | 6/2022 | Feenstra et al. | |
| 2011/0290509 | A1 | | 1/2011 | Uppal | |
| 2012/0186831 | A1 | | 7/2012 | Simpson et al. | |
| 2013/0000928 | A1 | | 1/2013 | Mason et al. | |
| 2023/0073149 | A1 | | 3/2023 | Maas, Jr. | |
| 2023/0079327 | A1 | | 3/2023 | Feenstra et al. | |
| 2023/0285787 | A1 | | 9/2023 | Feenstra et al. | |

OTHER PUBLICATIONS

Interstate Technology Regulatory Council "Aqueous Film-Forming Foam (AFFF)", Oct. 2018, 12 pages.

* cited by examiner

FIRE SUPPRESSION SYSTEM AND METHOD FOR A HELICOPTER LANDING PAD

This application is a 35 U.S.C. § 371 application of International Application No. PCT/US2019/063004, filed Nov. 25, 2019, which claims the benefit of U.S. Provisional Application No. 62/771,244, filed Nov. 26, 2018, and U.S. Provisional Application No. 62/829,751, filed Apr. 5, 2019, each of which is incorporated by reference in its entirety.

FIELD

The present disclosure relates to fire suppression systems and methods, and more particularly to fire suppression systems and methods for fighting fires on helicopter landing pads.

BACKGROUND

Conventional fire protection systems for extinguishing fires on the surface of helicopter landing pads ("helipads") having a solid floor include fire suppression nozzles that are positioned on the perimeter of the area to be protected in order not to be an obstruction. U.S. Pat. No. 6,182,767 ("the '767 patent") shows a fire protection system that protects aircraft parked on a solid floor of a hanger. In the '767 patent, the nozzles are grate nozzles that are installed in trenches. When grate nozzles are used to protect aircraft on helipads, the nozzles are typically installed in trenches that run along the perimeter of the area to be protected on the helipad. In these systems, a plurality of nozzles are used so as to ensure that the fire suppression fluid (e.g., water, foam, or some other fire suppressant fluid) covers the top surface of the area where the aircraft are parked. Thus, such an arrangement can be inefficient with respect to the number of nozzles, the amount of fire suppression fluid needed to protect the helipad area, and/or the time required to cover the floor or helipad area. Consequently, there is a need for a fire suppressant system that can quickly and efficiently deliver fire suppression fluids to a helipad deck area.

In addition, conventional nozzles typically spray film forming foam solutions on the fire such as, for example, an aqueous film forming foam (AFFF) solution, a film forming fluoroprotein foam (FFFP) solution, an alcohol resistant concentrate (ARC) solution, a fluoroprotein foam (FP) solution, or some other film forming foam solution. The solutions are typically 94% to 99% water with the remaining percentage being the concentrate. Traditionally, many such film forming foam solutions contained C8-based fluorinated surfactants. However, the use of C8-based fluorinated surfactants in firefighting foams has been dramatically reduced, either voluntarily or by government regulations. This is because C8-based fluorinated surfactants can degrade into per- and polyfluoroalkyl substances (PFAS) such as, for example, perfluorooctane sulfonate (PFOS) and perfluorooctanoic acid (PFOA), which are considered to be persistent, bioaccumulative, and toxic (PBT). Currently, many fire protection systems employ C6-based film forming foam solutions in the composition because a C6-based solution does not degrade into a PFSA and is not considered to be a PBT.

However, fire suppression systems that use conventional nozzles may not be able to use many types and/or grades of C6-based film forming foam solutions and/or synthetic liquid concentrates (e.g., fluorine free solutions) and still be compliant with the drain time and foam expansion value criteria of the Foam Quality Tests section of the UL 162 standard for a Type III nozzle and a foam concentrate, as published in "UL 162, Standard For Safety: Foam Equipment and Liquid Concentrates" dated Feb. 23, 2018 (hereinafter "UL standard") and incorporated herein by reference in its entirety, and with the drain time and foam expansion ratio criteria of the Low Expansion Foam Concentrate Extinguishing Performance section in the FM 5130 standard for a foam concentrate, as published in "Approval Standard for Foam Extinguishing Systems: Class Number 5130" dated January 2018 (hereinafter "FM standard") and incorporated herein by reference in its entirety. Consequently, there is also a need for a fire suppression nozzle that can spray a variety of film forming foam solutions, including C6-based solutions and/or synthetic solutions (e.g., as defined in the UL Standard and/or the FM Standard).

SUMMARY

Exemplary embodiments of the present invention are directed to a fire suppression nozzle that is configured to effectively spray a fire suppression agent onto a fire suppression target area of a surface area, such as, for example, a surface of an aircraft landing and/or storage area (hereinafter referred to as a "deck" or "deck area"). The fire suppression target area is an area of the deck that is designated as needing fire protection. The fire suppression target area can be the entirety of the deck area or only a portion of the deck area. Preferably, the deck is the deck of a helipad. As used herein, "agent" is a chemical-based fluid. For example, an agent can be a fire suppression fluid such as, for example, an AFFF solution, a FFFP solution, an ARC solution, a FP solution, or some other chemical-based fluid. As used herein, "effectively spray a fire suppression agent" means spraying the fire suppression agent onto the target area while conforming to the foam quality and performance tests of the UL standard and/or the FM standard. Preferably, the fire suppression agent can be a C6-based solution having a foam concentrate in a range of 1% to 6%. Because foam concentrates are made available in discrete concentration values (e.g., 1%, 3%, 6%, etc.) by the manufacturers, those skilled in the art understand that a foam concentrate in a range of 1% to 6% means the foam concentrate value can be any one of the discrete concentration values such as, for example, 1%, 2%, 3%, 4%, 5%, and 6% (or other values in between). In some exemplary embodiments, the fire suppression agent can be a synthetic solution as defined in the UL Standard and/or the FM Standard.

In some embodiments, the present disclosure is directed to a fire suppression nozzle that discharges fire suppression fluid such as, for example, water, a fire suppression agent, or some other fire suppression fluid. That is, some exemplary embodiments of the nozzle are not limited to effectively spraying a fire suppression agent and can spray other types of fire suppression fluids, including nozzles that spray the other types of fluids while conforming to an UL standard and/or a FM standard. Preferably, the fire suppression nozzle includes a body portion defining a passage extending through the body portion along a longitudinal axis of the body portion. The passage includes an inlet for receiving fire suppression fluid from a fire suppression fluid source. Preferably, the fire suppression solution is a C6-based solution having a concentrate in a range of 1% to 6%. In some exemplary embodiments, the fire suppression agent can be a synthetic solution as defined in the UL Standard and/or the FM Standard. The passage also includes an outlet for discharging the fire suppression fluid onto a deck area such as, for example, the deck area of a helipad. Preferably, the nozzle includes a deflector portion configured to spray the fire suppression solution exiting the nozzle in a radial pattern (also referred to herein as "radial spray pattern"), which can be, for example, a 90-deg. spray pattern, a 180-deg. spray pattern, a 360-deg. spray pattern, or some other spray pattern. Preferably, the fire suppression solution exits the nozzle in a generally lateral direction. That is, a trajectory of the fire suppression solution has a low discharge angle with respect to the surface of the deck (e.g., less than a 45-deg. angle). For example, the maximum height of the spray can be in a range of about 12 inches to 18 inches and, more preferably, less than 12 inches.

In some embodiments, the deflector portion includes a deflector flange having a plurality of projecting members for supporting the deflector flange above the body portion at a predetermined height. The predetermined height is in a range of 0.125 inch to 0.250 inch. The projecting members preferably have a pair of arcuate sidewalls that converge to a point in a radially inner end and a radially outer end of the projecting members. In some embodiments, the deflector portion includes a web portion for coupling to the body portion. Preferably, the web portion has a plurality of vanes extending radially therefrom at spaced locations.

In some embodiments, a portion of the body portion at the inlet of the passage includes one or more aeration holes extending therethrough. Preferably, the inlet of the passage is defined by a cylindrical shape. Preferably, the passage includes a radially extending flange at the outlet. In some embodiments, a restrictor plate is disposed at the inlet of the passage. Preferably, the restrictor plate has an aperture extending therethrough and a size of the aperture corresponds to a desired K factor of the nozzle.

In some embodiments, the deflector portion includes a flange portion having a channel (e.g., a V-shaped channel or a U-shaped channel) in a lower surface of the flange portion and an O-ring seal disposed in the channel between the body portion and the deflector portion to restrict the spray pattern to less than 360 degrees.

The present disclosure is also directed to a nozzle assembly that includes a spray-type fire suppression nozzle (e.g., a nozzle as discussed above and in further detail below), and nozzle frame, and a nozzle enclosure. Preferably, the fire suppression nozzle is installed in the nozzle frame, which has a through-passage for receiving the nozzle. Preferably, the nozzle frame includes one or more drainage holes that circumscribe the through-passage of the nozzle frame. The drainage holes help prevent debris from collecting in or near the exit passageways of the spray-type fire suppression nozzle. In addition, the drain holes can be a source of air for aeration of the fire suppression fluid. The nozzle enclosure can collect the fluids such as, for example, water and oil, that drain from the deck area through the drainage holes. Preferably, when the nozzle assembly is installed in the deck, the top surface of the nozzle assembly is flush with the deck area.

The present disclosure is also directed to a fire suppression system for an aircraft deck area, which can be, for example, the surface of an aircraft runway, a hanger floor, a hangar deck and/or a flight deck on an aircraft carrier, a helipad platform, or some other landing and/or storage area surface. Preferably, the fire suppression system is for the deck area on a helipad. The fire suppression system can include one or more spray-type fire suppression nozzles located in an interior portion of the helipad for delivering a fire suppressant fluid to a fire suppression target area on a surface of the deck. The fire suppression system can deliver a fire suppressant fluid such as, for example, water, a fire suppression agent, or another type of fire suppression fluid, to the deck via one or more of the spray-type nozzles. Preferably, the flow from the spray-type nozzles discharges in a radial pattern extending generally in a lateral direction so that the fire suppressant fluid is sprayed under the main body of the aircraft (e.g., helicopter) to minimize contact with the aircraft (e.g., helicopter). In some embodiments, the fire suppressant system includes a nozzle assembly which is capable of supporting heavy loads such as, for example, the weight of a helicopter, and still maintain operation to protect the fire suppression target area.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3A:
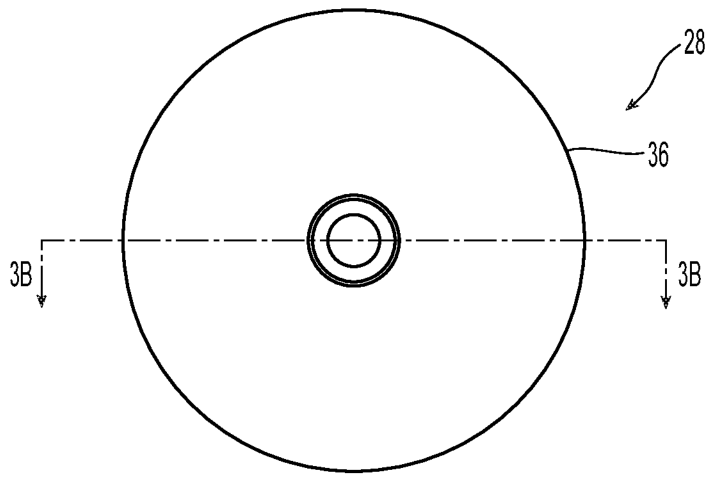
FIG. 3A illustrates a top view of the nozzle illustrated in FIGS. 2A, 2B, and 2F.
Figure 4A:
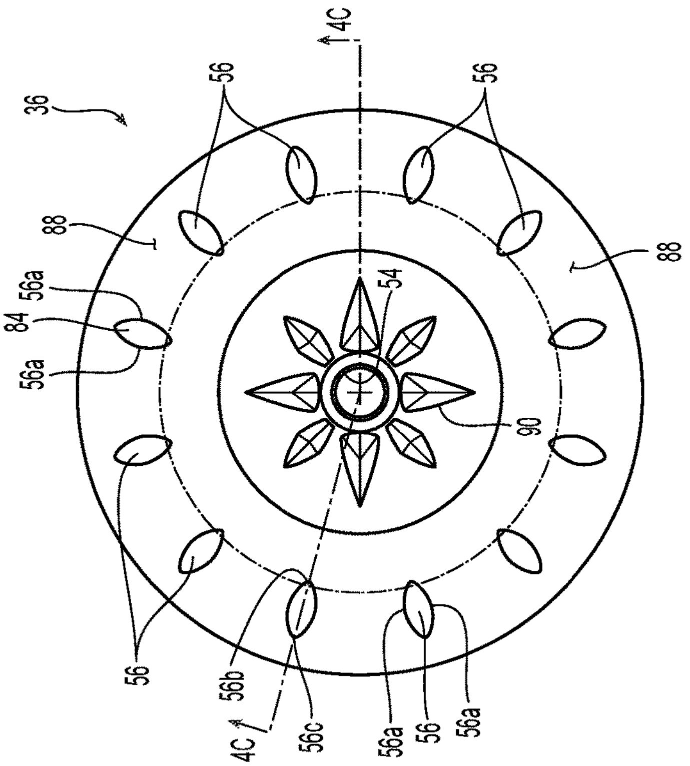
Figure 4C:
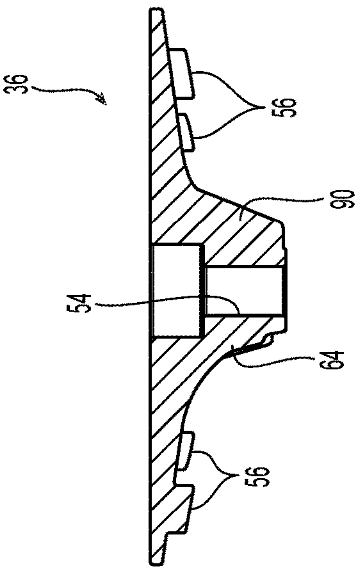
Figure 4B:
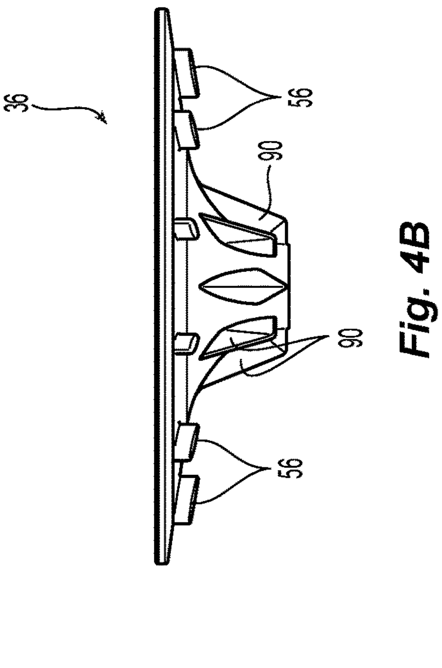
Figure 5A:
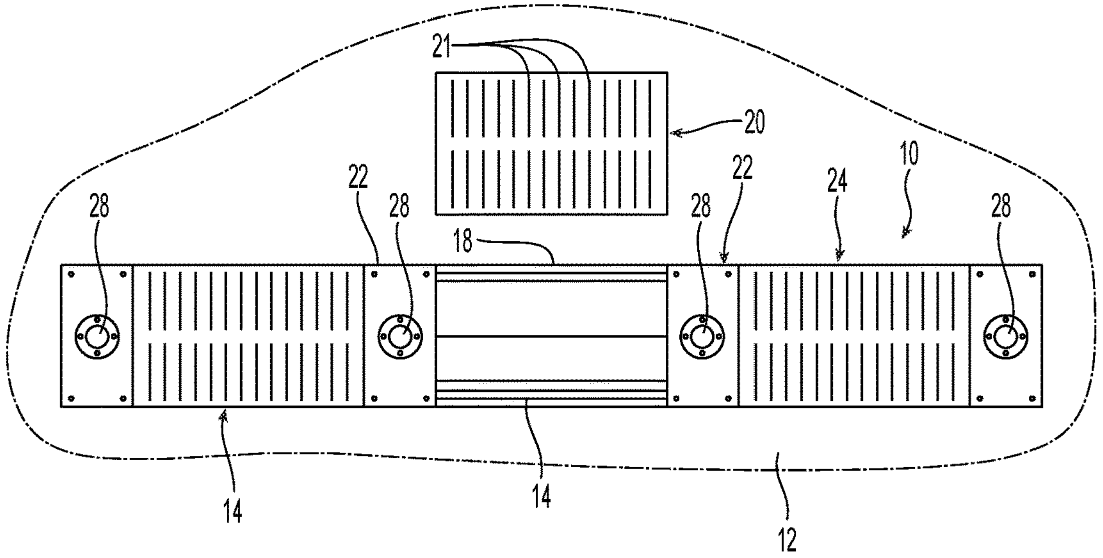
Figure 5B:
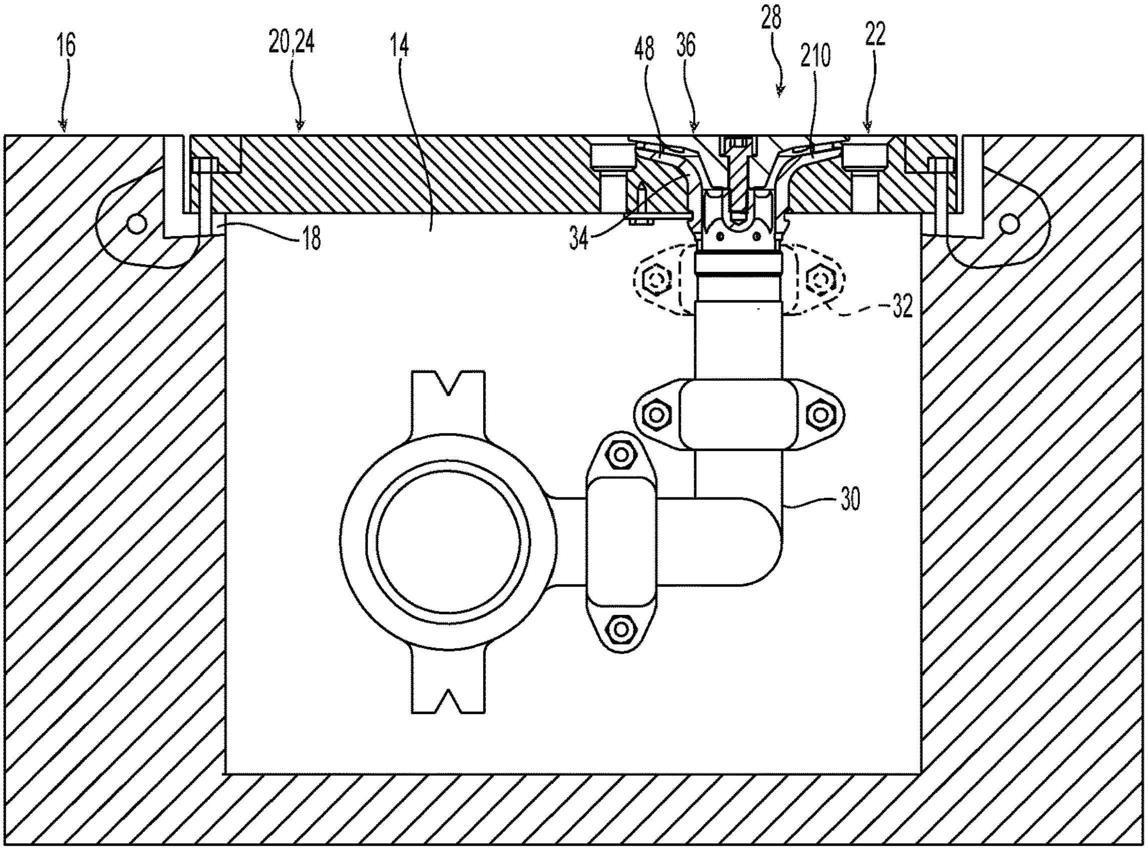
Figure 6A:
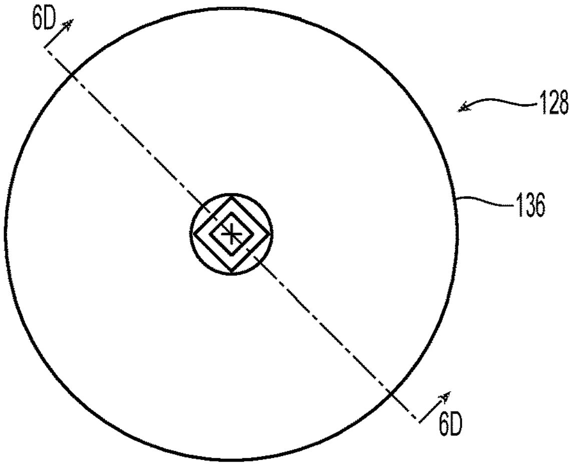
Figure 6B:
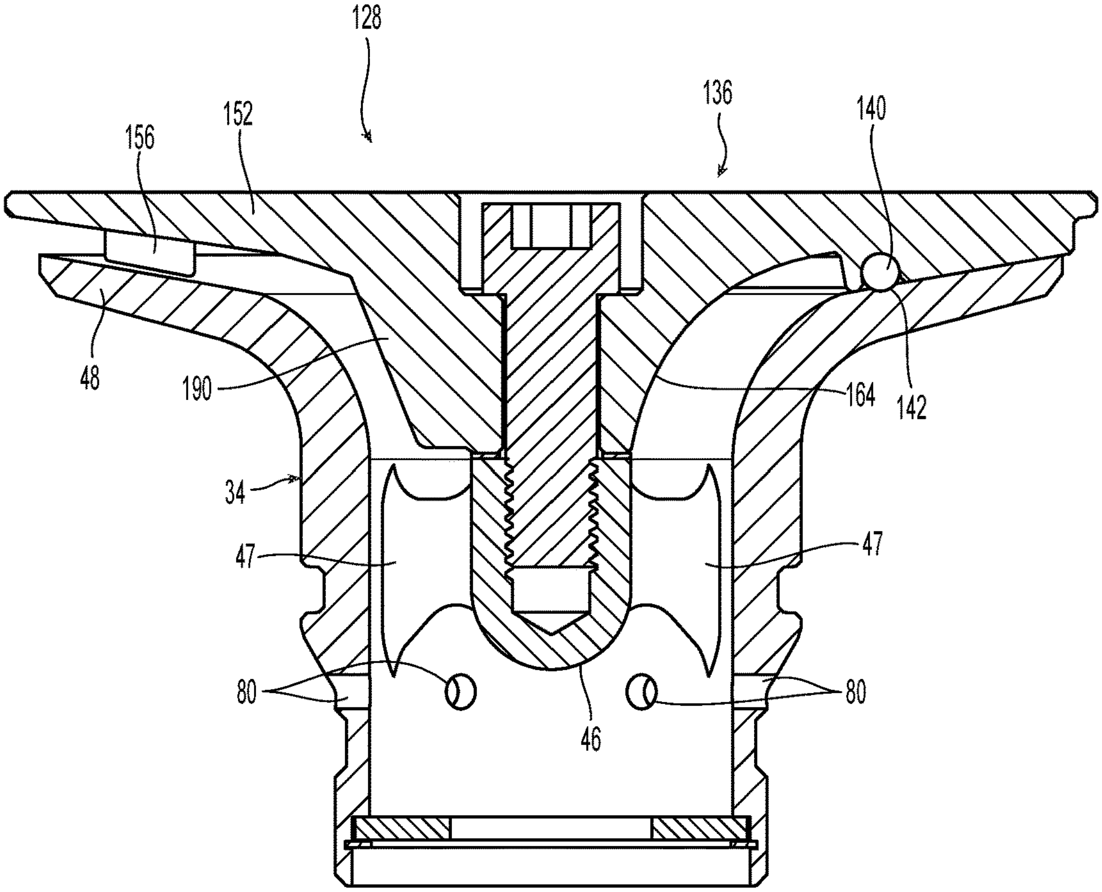
Figure 6D:
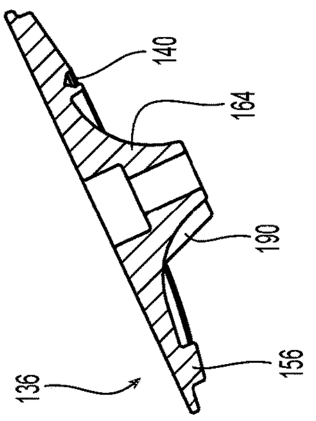
Figure 6F:
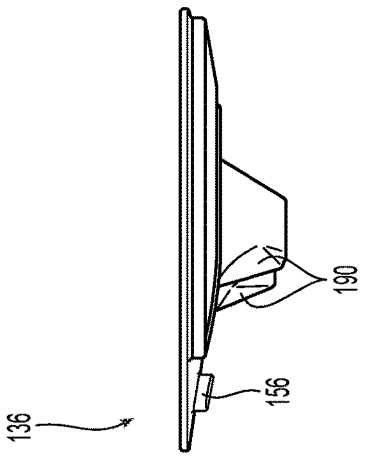
Figure 6C:
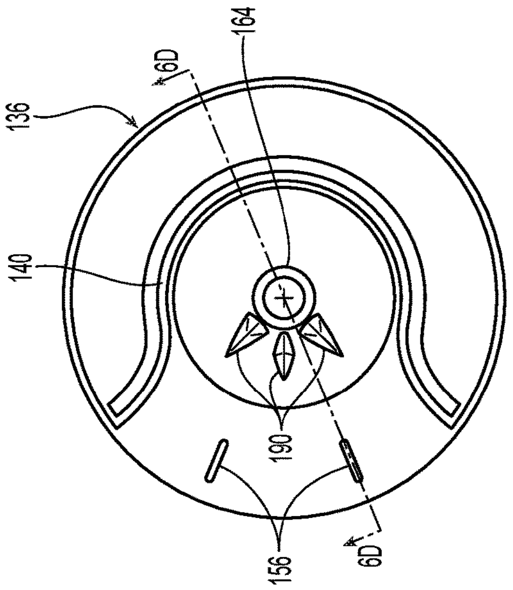
Figure 6E:
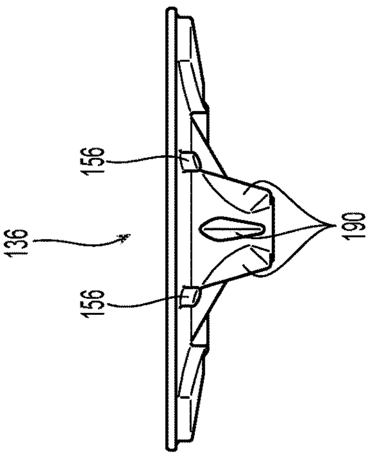
Figure 7B:
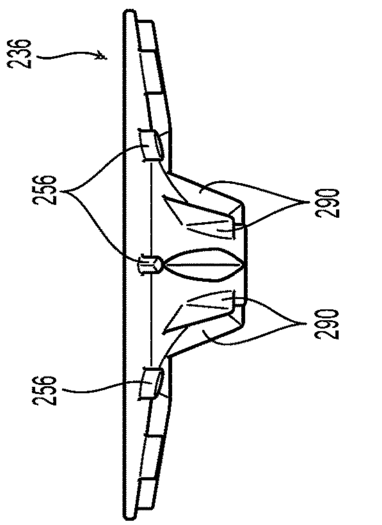
Figure 7D:
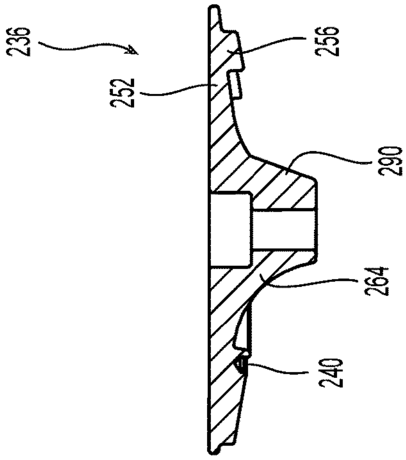
Figure 7A:
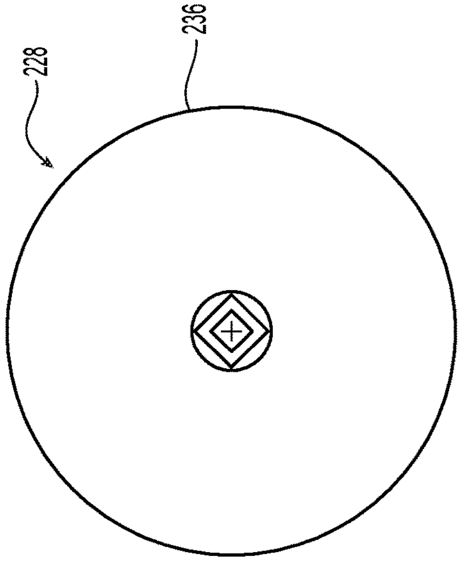
Figure 7C:
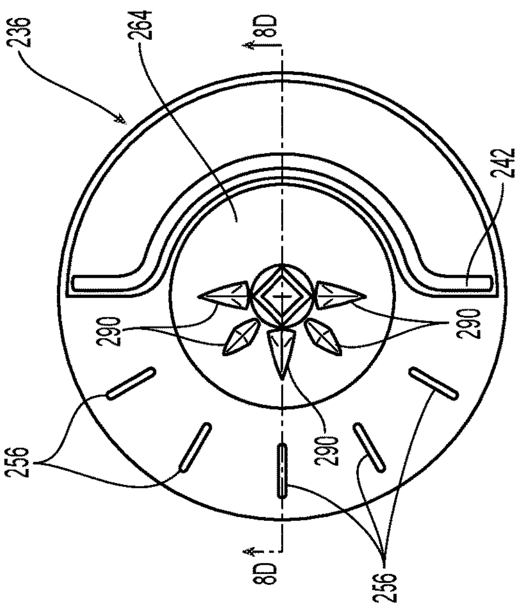

FIGS. 4A, 4B, and 4C illustrate bottom, side, and side cross-sectional views, respectively, of the deflector portion of the nozzle of FIG. 3A;

FIG. 5A illustrates a plan view of a section of a trench of a deck area with the portion of the grating removed;

FIG. 5B illustrates a cross-section view of a section of the trench illustrating a nozzle and floor grating assembly installed over the trench;

FIG. 6A illustrates a top view of a nozzle according to another embodiment of the present disclosure;

FIG. 6B is a cross-sectional view of the nozzle of FIG. 6A;

FIG. 6C illustrates a bottom view of the deflector portion of the nozzle of FIG. 6A;

FIG. 6D illustrates a cross-sectional view of the deflector portion of FIG. 6C;

FIG. 6E illustrates a front view of the deflector portion of FIG. 6C;

FIG. 6F illustrates a side view of the deflector portion of FIG. 6C;

FIG. 7A illustrates a top view of a nozzle according to another embodiment of the present disclosure;

FIG. 7B illustrates a front view of the deflector portion of the nozzle of FIG. 7A;

FIG. 7C illustrates a bottom view of the deflector portion of FIG. 7B; and

FIG. 7D illustrates a cross-sectional view of the deflector portion of FIG. 7B.

Corresponding reference numerals indicate corresponding parts throughout the several views of the drawings.

DETAILED DESCRIPTION

Exemplary embodiments of the present disclosure are directed to fire suppression nozzle assemblies and systems for the deck area of a helipad. Exemplary embodiments of the present disclosure deliver sufficient fire suppression fluid to the deck area to totally flood the deck area while distributing the fire suppression fluid to the area in a manner to minimize contact with the aircraft stored or positioned in the deck area. In addition, the fire suppression nozzle assembly, including the fire suppression nozzle, the nozzle frame and/or nozzle grating, can resist heavy loads such as the weight from an aircraft wheel, a wheel of a fire fighting vehicle, or other heavy load, and can maintain operation on at least a limited basis even with the wheel of the vehicle parked on top of the nozzle assembly so long as the nozzle outlet is not blocked. In this manner, the fire suppression nozzle assemblies and systems of the present disclosure can operate without obstruction from the vehicles in the vicinity of the deck area including those that are positioned over the nozzle assembly.

While exemplary embodiments are described in the context of protecting the deck area of a helipad, those skilled in the art will understand that the present technology can be applicable to the protection of other types of surfaces such as, for example, surface of an aircraft runway, a loading bay (e.g., a truck loading bay), an automobile garage or other storage area, a hanger floor, a hangar deck and/or a flight deck on an aircraft carrier, some other aircraft landing/storage area and/or some other vehicle storage area. Preferably, the fire suppression nozzle is configured to effectively spray a fire suppression fluid onto a fire suppression target area, which can be the entirety of the deck area of the aircraft or a portion thereof. In some embodiments, the fire suppression system includes one or more spray-type fire suppression nozzles that are installed in an interior portion of the surface of the fire suppression target area. Preferably, the fire suppression agent can be a C6-based solution having a concentrate in a range of 1% to 6%. In some exemplary embodiments, the fire suppression agent can be a synthetic solution as defined in the UL Standard and/or the FM Standard.

Figure 1A:
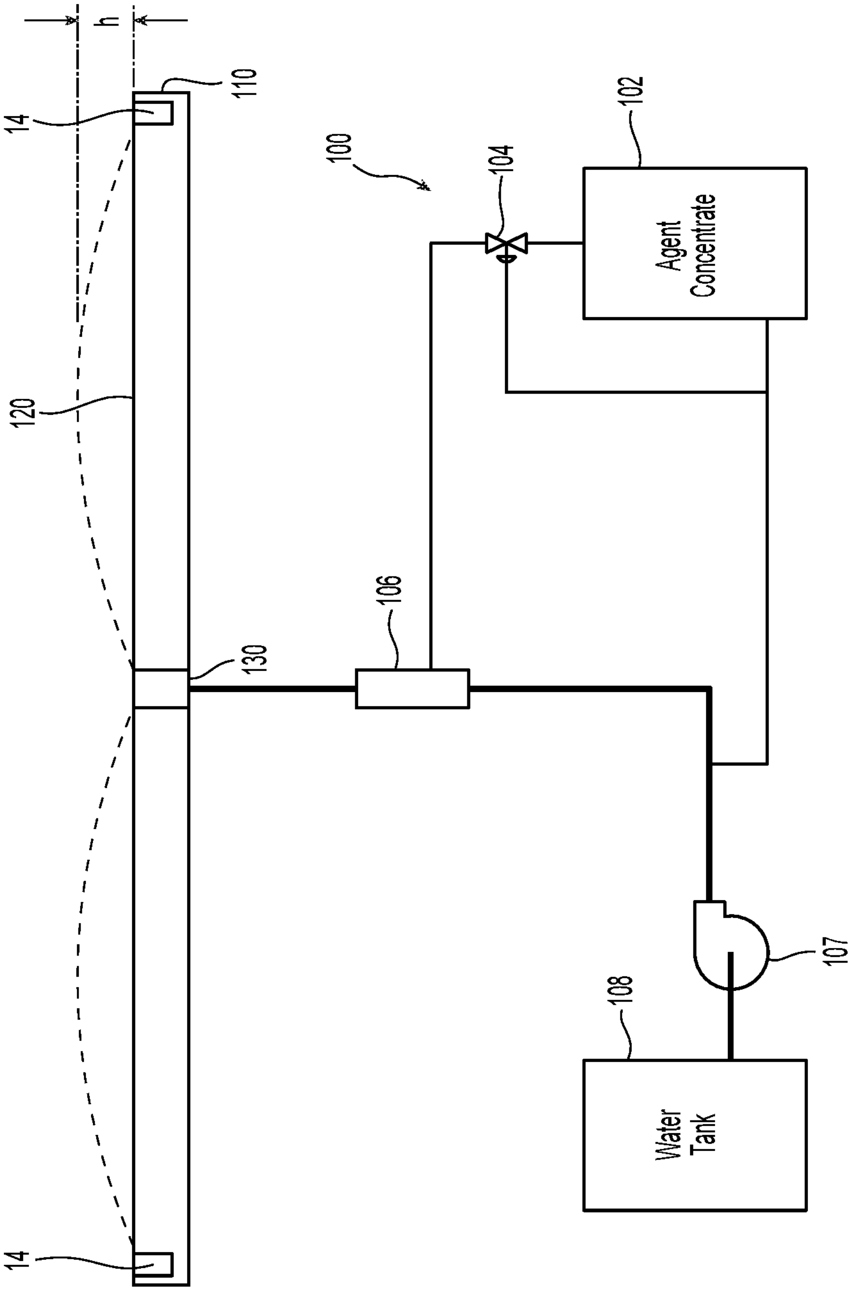
FIG. 1A illustrates a simplified overview of a fire suppression system protecting an aircraft deck in accordance with an embodiment of the disclosure.

FIG. 1A illustrates an embodiment of the present disclosure in which a fire suppression system protects an aircraft deck area that is part of a helipad. The helipad 110 can be protected by a fire suppression system 100 that can include a water storage tank 108 (or another source of water) and a pump 107 for transferring the water to the fire suppression nozzle assembly 130. Preferably, the deck area of the helipad 110 is solid and impervious. That is, the helipad deck is not a grated-type surface that allows water and/or foam to drain rapidly. The fire suppression system 100 can also include a concentrate storage tank 102 for storing a fire suppressing foam concentrate such as, for example, a C6-based concentrate, a synthetic concentrate (e.g., as defined in the UL Standard and/or the FM Standard) or another type of fire suppressing foam concentrate. The concentrate storage tank 102 can be, for example, a bladder-type tank such that pressure on the bladder from an external source will force the foam concentrate out the discharge of the tank. Of course, other types of discharge tanks can also be used. An inline proportioning device 106 can be disposed in the discharge line of the pump 107 between the pump 107 and the fire suppression nozzle assembly 130. The proportioning device 106 receives the fire suppression concentrate from the concentrate storage tank 102 and introduces a controlled flow of the foam concentrate into the water flow from the pump 107. In some embodiments, a concentrate control valve 104 can be disposed in the line between the concentrate storage tank 102 and the proportioning device 106 to regulate the concentrate going to the proportioning device 106.

When fire suppression system 100 is activated (e.g., due to a fire on the deck area 120, an oil or fuel leak on the deck area 120, or some other reason), the pump 107 is turned on to transfer water to the fire suppression nozzle assembly 130. A portion of the water from the pump 107 can be diverted to the concentrate storage tank 102 to pressurize the tank and force the foam concentrate into the piping network. Of course, other methods such as, for example, a pump for the concentrate, a pressured concentrate storage tank, and/or another method to transfer the concentrate to the proportioning device 106 can be used. The control valve 104 can help regulate the concentrate flow from the concentrate storage tank 102. In some embodiments, the pressure from the discharge of the pump 107 can be used to provide proportional control of the control valve 104. For example, as seen in FIG. 1A, the control valve 104 can be set up such that the foam concentrate flow is a function of the discharge pressure from pump 107.

The fire system piping transfers the fire suppressing fluid, which can be a solution of foam concentrate and water, from the proportioning device 106 to the fire suppression nozzle assembly 130 installed in the helipad 110. The fire suppression nozzle assembly 130 discharges the fire suppression fluid in a predetermined spray pattern to cover all or part of the deck area 120. The predetermined spray pattern can be a radial spray pattern in a range that is greater than 0 deg. and up to 360 deg. For example, the radial spray pattern can be a 90-deg. spray pattern, 180-deg. spray pattern, 360-deg. spray pattern, or some other radial spray pattern value. In some embodiments, the fire suppression nozzle assembly 130 has a 360-deg. spray pattern extending outward in a generally laterally direction from the fire suppression nozzle assembly 130 to cover a fire suppression target area that (see dotted line in FIG. 1A). An outer radius of the fire suppression area can correspond to, depending on the K-factor and the inlet pressure, a radius in a range of 5 feet to 30 feet, more preferably, in a range of 10 to 25, and even more preferably, about 25 feet. In some embodiments, the fire suppression fluid from the nozzle hits the deck prior to the outer radius of the coverage area, but then spreads to the outer radius of the coverage area. For example, if the coverage area corresponds to a radius of 25 feet, the fire suppression fluid from the nozzle could hit the deck at an outer radius in a range of 12 feet to 14 feet and then spread along the deck to cover the area corresponding to a radius of 25 feet. Preferably, a trajectory of the fire suppression solution has a low discharge angle with respect to the surface of the deck (e.g., less than 45-deg. angle). Because the spray pattern in a generally lateral direction, exemplary embodiments of the fire suppression nozzle assembly 130 can be used to protect decks such as, for example, helipad platforms, where the fire suppression fluid is generally sprayed under the aircraft (e.g., helicopters). For example, in some embodiments, the maximum height h (see FIG. 1A) of the spray can be in a range of about 12 inches to 18 inches and, more preferably, less than 12 inches.

Figure 1B:
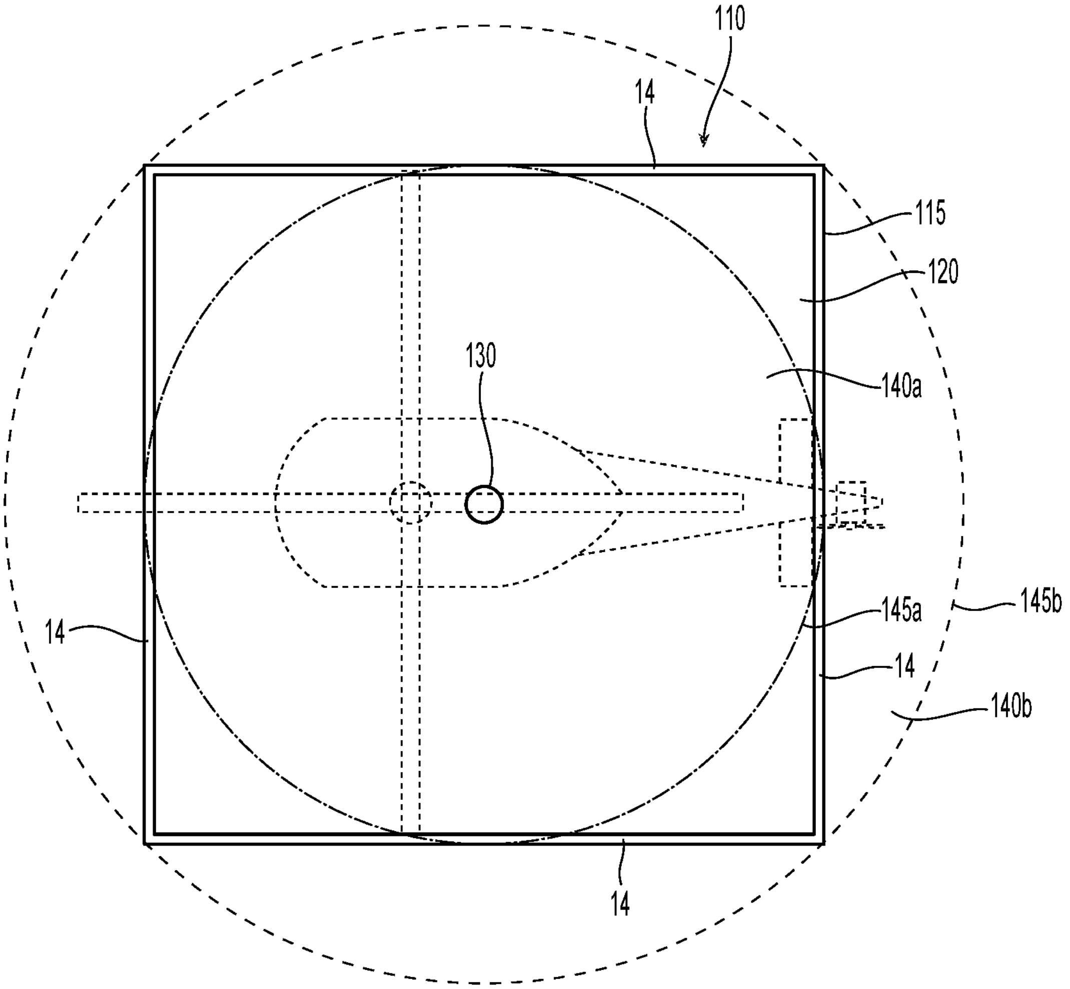
FIG. 1B illustrates a top view of the aircraft deck of FIG. 1A.

In an exemplary embodiment, for example, as seen in FIG. 1B, the helipad 110 includes an outer boundary 115 that defines the deck area 120 for use by one or more helicopters as a landing and/or storage area. The deck area 120 can be constructed of impervious material capable of withstanding the load of the helicopters landing on the helipad 100. For example, the deck area of the helipad 100 can be made of concrete, a metal plates (e.g., aluminum, stainless steel, or another metal or alloy), or another type of impervious material capable of withstanding the load of the helicopter. As used herein, "impervious material" means material that resists a rapid absorption and/or drainage of water and/or foam solution through the material but can include material that absorbs some water and/or foam solution. The surface of the deck area 120 is generally flat to minimize the pooling of any fuel and/or oil that may leak on to the surface. The deck area 120 can include one or more drainage points and/or areas on, for example, the perimeter of the deck area to drain liquids such as water, oil, and/or fuel. Preferably, trenches 14 can be installed along the premier of the boundary 115. In some embodiments, the deck area 120 can be gently sloped or tilted toward the drainage points (e.g., trenches 14) to facilitate the draining of any liquid on the surface of the deck area 120.

In many conventional systems, helipads are protected using fire suppression nozzles (e.g., monitors) that are located on the perimeter of the deck area of the helipad. This is, in part, due to regulations that require that the deck area be free of obstacles and nothing in the "field of vision" or the "line of sight" of the pilot above the deck. However, with a perimeter configuration, at least four fire suppression nozzles will be needed (e.g., four 90 deg. nozzles at the corners and/or four 180 deg. nozzles on the sides of the deck area 120). In exemplary embodiments of the present invention, the helipad deck (and other aircraft decks) can be protected using a reduced number of fire suppression nozzles.

For example, as seen in FIG. 1B, the spray-type fire suppression nozzle assembly 130 can be disposed in an interior portion of the deck 120 and can be configured to cover the deck 120 with a fire suppression fluid such as, for example, water, a fire suppression agent, or another fire suppression fluid, when the fire suppression system is activated. In some embodiments, the fire suppression fluid is a fire suppression agent, e.g., a C6-based agent such as, for example, an AFFF solution, a FFFP solution, an ARC solution, a FP solution, or another C6-based solution and/or a synthetic solution as defined in the UL Standard and/or the FM Standard. In some embodiments, the fire suppression nozzle assembly 130 discharges the fire suppression fluid in a 360-deg. pattern to cover an area of the helipad deck that is to be protected. The area to be protected is hereinafter referred to as the "fire suppression target area." As seen in FIG. 1B, a spray-type fire suppression nozzle assembly 130 can be configured to discharge the fire suppression fluid in a 360-deg. pattern to cover a fire suppression target area 140*a* defined by the dotted line 145*a*. In this case, the fire suppression target area 140*a* represents a fire suppression target area that is less than the area of the deck 120. That is, as seen in FIG. 1B, the corners of the deck 120 may not receive the fire suppression fluid.

However, if the entire deck area needs to be protected and the dimensions of deck 120 permit it, a single fire suppression nozzle assembly 130 can be configured to cover the entirety of the deck 120. For example, as seen in FIG. 1B, the nozzle assembly 130 can be configured to cover the fire suppression target area 140*b*, which is defined by line 145*b*. The fire suppression target area 140*b* covers the entire surface area of deck 120. In some embodiments, for example as seen in FIG. 1B, the helipad 110 is protected by a single fire suppression nozzle assembly 130 located at a geometric center of the deck area 120 to within a predetermined distance. The predetermined distance can be a distance that does not substantially affect the coverage area for fire suppression fluid on the deck 100. By locating the fire suppression nozzle assembly 130 near the geometric center, embodiments of the present disclosure can cover the deck area 120 faster and more efficiently with the fire suppression fluid such as, for example, water, C6-based solution, a synthetic solution as defined in the UL Standard and/or the FM Standard, or another fire suppression fluid, than conventional systems that use perimeter protection.

Figure 1C:
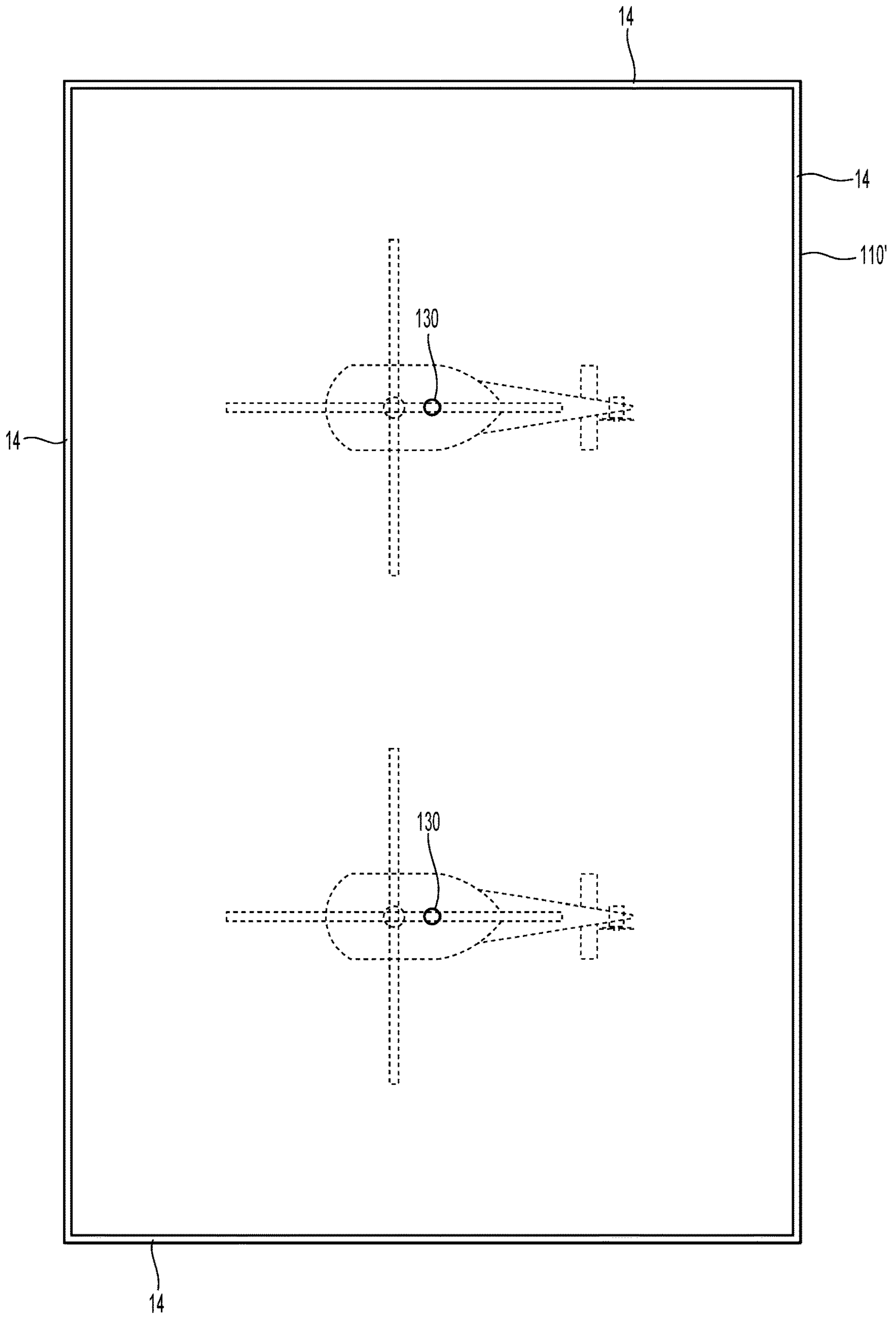
FIGS. 1C and 1D illustrate exemplary two and four fire suppression nozzle assembly arrangements in accordance with another embodiment of the disclosure.
Figure 1D:
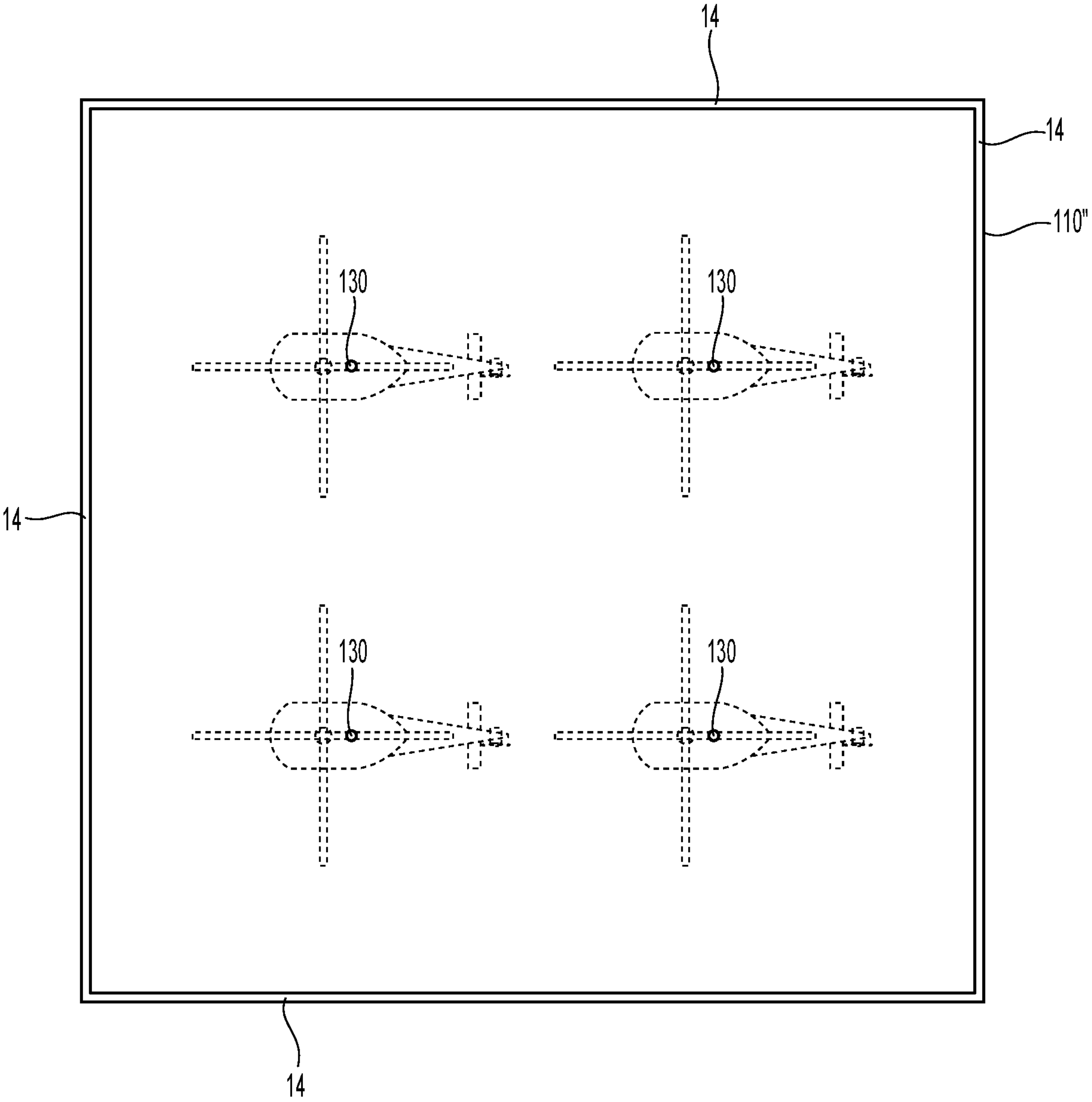

If the dimensions of deck 120 are such that a single fire suppression nozzle 130 cannot provide a spray pattern to cover the fire suppression target area, then additional fire suppression nozzles assemblies can be disposed in the interior portion of the deck 120. For example, FIGS. 1C and 1D illustrate exemplary two and four fire suppression nozzle assembly arrangements for larger helipad platforms 110' and 110", respectively. To the extent additional coverage is still needed, other fire suppression nozzle assembly configurations such as, for example, nozzle assemblies having a 90-deg. spray pattern, 180-deg. spray pattern, and/or another spray pattern can be added for protection (e.g., in the corners and/or other areas of deck 120) either in the interior portion and/or perimeter of the deck 120. In addition to one or more nozzle assemblies 130, one or more grate-type nozzle assemblies can be installed in trenches 14 as appropriate to protect the deck 120. Of course, depending on the shape, size, installation (e.g., roof top, oil rig, or another location), and/or other criteria concerning the helipad, those skilled in the art understand that in addition to an interior placement of a nozzle assembly (e.g., a 90-deg., 180-deg., 360-deg., or other nozzle configuration), any combination of additional nozzle assemblies 130 and/or grate-type nozzle assemblies (including, e.g., 90-deg. nozzles, 180-deg. nozzles, 360-deg. nozzles, and/or other nozzle configurations) can be installed in the interior portion and/or perimeter of the deck 120.

Figure 2A:
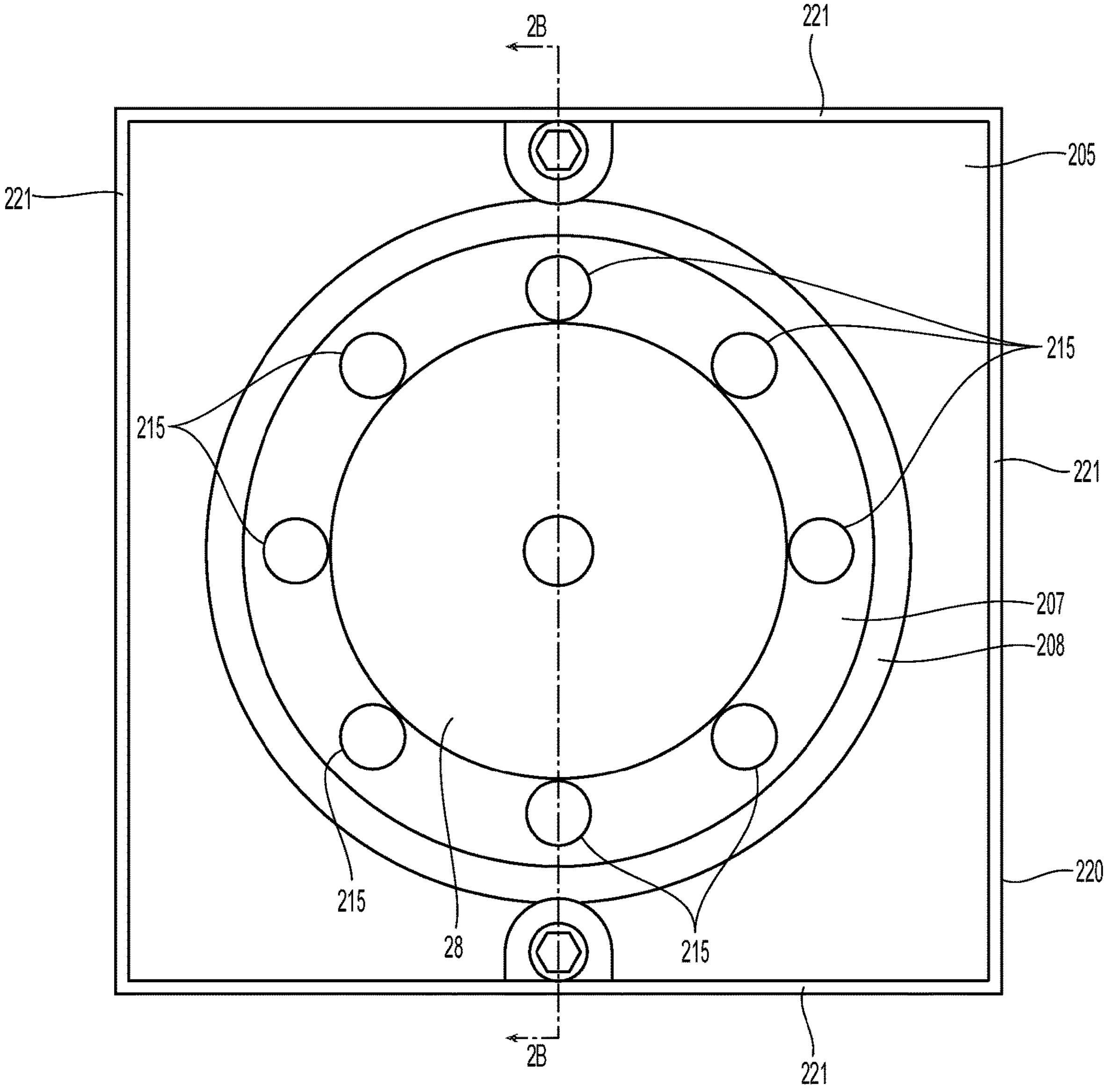
FIG. 2A illustrates a top view of the nozzle assembly of FIG. 1.
Figure 2B:
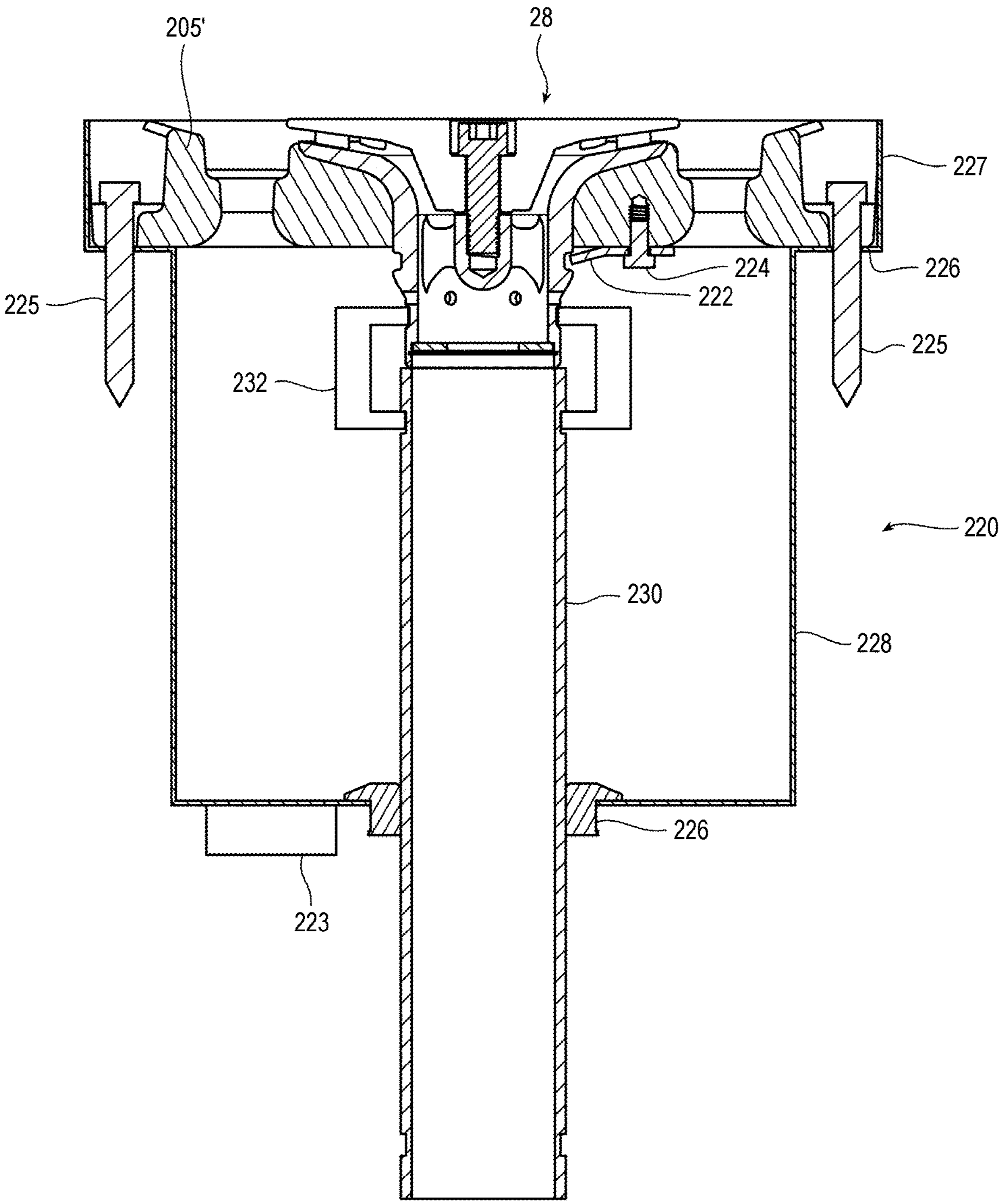
FIG. 2B illustrates a cross-sectional view of the nozzle assembly of FIG. 2A with the nozzle frame of FIG. 2E.
Figure 2C:
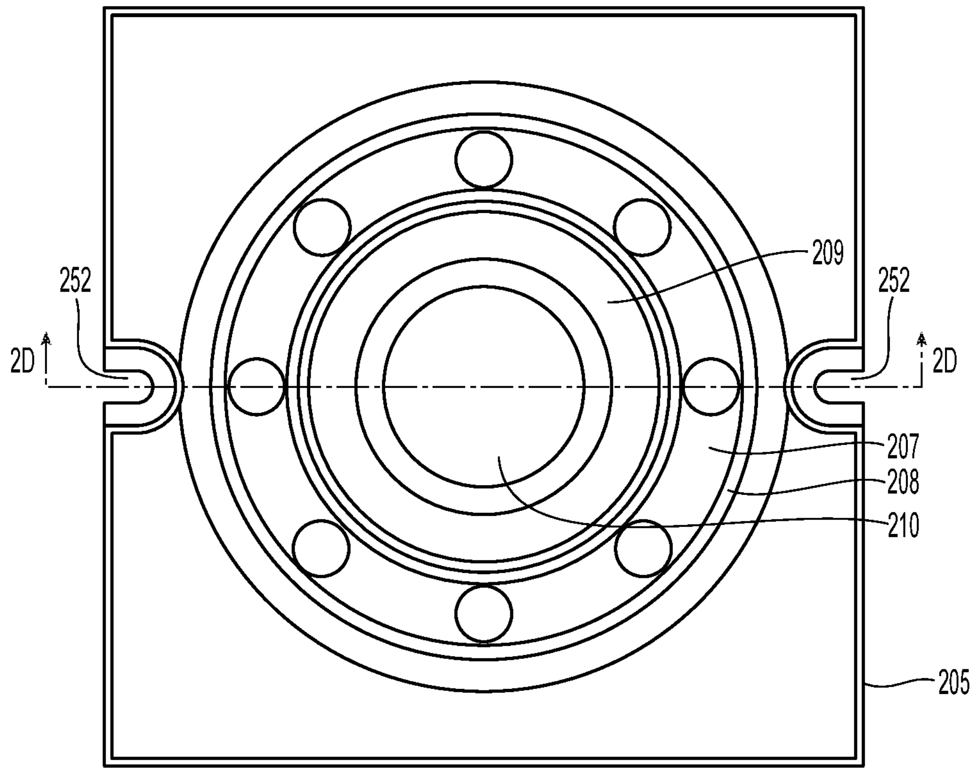
FIGS. 2C and 2D illustrate top and cross-sectional views of the nozzle frame illustrated in FIG. 2A.

FIG. 2A illustrates a top view of the nozzle assembly 130 and FIG. 2B illustrates a cross-sectional view of the nozzle assembly 130 but having another embodiment of a nozzle frame. FIG. 2C illustrates a top view of an embodiment of a nozzle frame that receives a fire suppression nozzle. As seen in FIGS. 2A and 2B, the nozzle frames illustrated in the respective figures are different. For example, the nozzle frame in FIG. 2A can be the embodiment illustrated in FIG. 2D and the nozzle frame illustrated in 2B can be the nozzle frame illustrated in FIG. 2E.

Figure 2D:
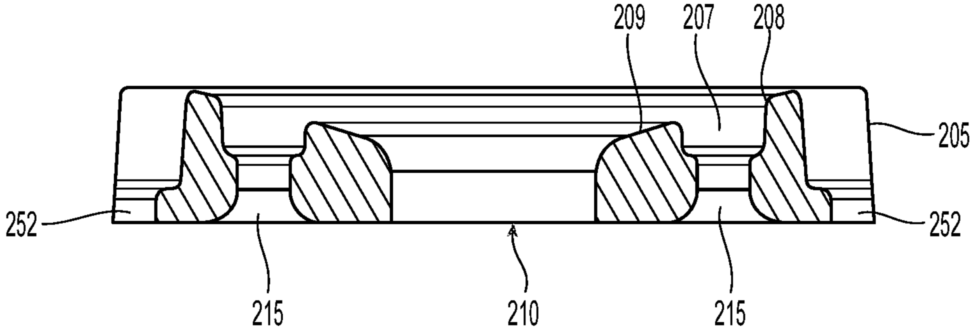
Figure 2E:
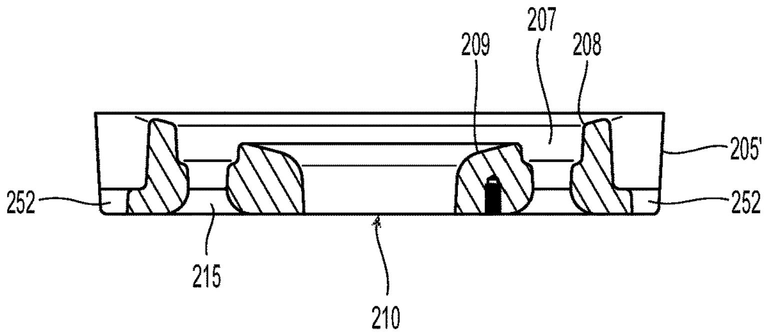
FIG. 2E illustrates a cross-sectional view of the nozzle frame illustrated in FIGS. 2B and 2F.

FIG. 2D illustrates a cross-sectional view of an exemplary nozzle frame 205 that receives a fire suppression nozzle. The nozzle frame 205 is configured such that the top portion of the nozzle frame 205 has width that is less than the bottom portion of the nozzle frame 205. FIG. 2E illustrates a cross-sectional view of an exemplary nozzle frame 205' that receives a fire suppression nozzle. In contrast to the nozzle frame 205, the nozzle frame 205' is configured such that the bottom portion of the nozzle frame 205 has width that is less than the top portion of the nozzle frame 205. In embodiments where the nozzle frames are cast, the difference in the top and bottom widths in the nozzle frames 205 and 205' can be accomplished by having an appropriate casting angle, such as, for example, 3 degrees. Of course, for the embodiments shown in FIGS. 2D and 2E, the casting angle of the nozzle frame 205 is opposite that of nozzle frame 205'.

As seen in FIGS. 2A-2E, the nozzle assembly 130 includes a spray-type nozzle 28, a nozzle frame 205 or a nozzle frame 205', and a nozzle enclosure 220. As seen in FIG. 2A, the width of the top portion of nozzle frame 205 is preferably less than the width of the inside of the top portion 227 of the nozzle enclosure 220 such that a perimeter spacing 221 exists between the nozzle frame 205 and the nozzle enclosure 220. In some embodiments, the perimeter spacing 221 can be required (e.g., to account for expansion and/or contraction due to, for example, temperature). The cross-sectional view in FIG. 2B is of a nozzle assembly 130 that includes a nozzle frame 205'. In contrast to the embodiment of FIG. 2A, as seen in FIG. 2B, the width of the top portion of the nozzle frame 205' is preferably approximately the same as the width of the inside of the top portion 227 of the nozzle enclosure 220 such that no perimeter spacing exists between the nozzle frame 205' and the nozzle enclosure 220. "No perimeter spacing" means that, while there can be some gaps between the nozzle frame 205' and the nozzle enclosure 220, the majority of the top of the nozzle frame 205' is in contact with the top of the nozzle enclosure 220. The absence of spacing can minimize dirt or other contaminants from entering the nozzle assembly 130, provide more ascetic appeal, and/or minimize walking/tripping hazards.

The nozzle frame 205 or 205' includes a through-passage 210 (see FIGS. 2C, 2D and 2E) for receiving the nozzle 28. For brevity and clarity, the description of the nozzle frame below will be given with respect to nozzle frame 205 and FIG. 2D, but those skilled in the art will understand that the description will also be relevant to nozzle frame 205' and FIG. 2E. Preferably, the nozzle frame 205 includes one or more drain holes 215 for draining any water runoff or other liquids from the deck 120 of helipad 110. Preferably, a plurality of drain holes 215 are disposed around the through-passage 210, and more preferably, disposed around the through-passage 210 such that the drain holes 215 circumscribe the outer perimeter of the nozzle 28 when installed in the nozzle frame 205.

In some embodiments, the nozzle frame 205 includes a recessed portion 207 defined by a lip 208. The recessed portion 207 is preferably disposed in a central portion of the nozzle frame 205. However, in some embodiments, the recessed portion can be offset from the center of the nozzle frame 205. The recessed portion 207 includes an annular tapered support surface 209 (FIGS. 2C and 2D) on which the body flange 48 of nozzle 28 rests (FIG. 2B). The bottom surface of body flange 48 is preferably angled to match tapered surface 209 so that there is uniform support for body flange 48 by nozzle frame 205.

A depth of the recessed portion 207 is such that, when the nozzle 28 is installed, the top surface of the nozzle 28 is generally flush with the top surface of the nozzle frame 205 (see FIG. 2B). Preferably, the through-passage 210 and the drain holes 215 are disposed in the recessed portion 207 such that the lip 208 circumscribes the drain holes 215. The drain holes 215 help keep the outlet of the nozzle 28 from getting blocked or obstructed by draining dirt and/or other particles before they enter the nozzle 28. In addition, for some embodiments, the drain holes 215 can be a source of the air passing through air holes or apertures 80 (FIG. 2B) during the aeration of the fire suppression fluid (discussed below). Preferably, the cross-sectional shape of the nozzle frame 205 is rectangular, and more preferably square, for example, as viewed from the top. However, the cross-sectional shape of the nozzle frame 205 is not limiting and the nozzle frame 205 can have other cross-sectional shapes such as, for example, a circular shape, a trapezoidal shape, a triangular shape, or some other appropriate polygonal shape, for example, as viewed from the top.

In some embodiments, as seen in the cross-sectional view in FIG. 2B, the nozzle 28 can be secured to the nozzle frame 205 using, for example, a spring clip 222 and screws 224 or by some other known means. Preferably, the nozzle frame 205 can be anchored to the deck 120 of the helipad 110 using, for example, screws 225 or some other type of mounting device. Preferably, the nozzle frame 205 is anchored in a recessed portion of the deck 120 such that the top surfaces of the nozzle frame 205 and the nozzle 28 are flush with the surface of the deck 120. The nozzle frame 205 can be made of any appropriate material such as, for example, a metal (e.g., ductile iron, aluminum, stainless steel), a ceramic, a composite material, or a combination thereof.

Figure 2F:
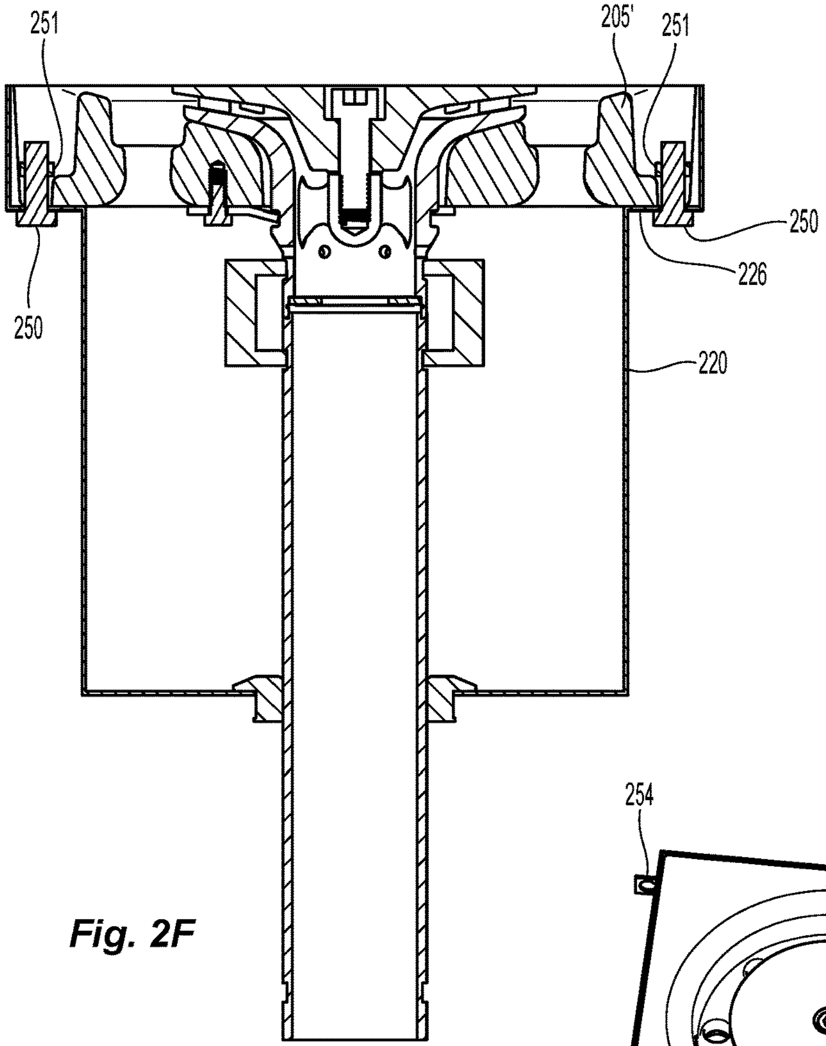
FIG. 2F illustrates a cross-sectional view of an embodiment of a nozzle assembly that uses bolts to secure the nozzle frame to the nozzle enclosure.

In some embodiments, the nozzle assembly 150 can include a nozzle enclosure 220 (see FIG. 2B). The nozzle enclosure 220 provides an enclosure for collecting the fluids drained from the deck area 120. As seen in FIG. 2B, the nozzle enclosure 220 acts as a housing for the nozzle 28 and the nozzle frame 205, which can serve as the lid to the nozzle enclosure 205. Preferably, the nozzle enclosure 220 includes a top portion 227 and bottom portion 228. The top portion 227 is preferably configured to receive and support the nozzle frame 205. In some embodiments, the top portion 227 has an outer perimeter that is greater than the bottom portion 228. Preferably, the transition from the top portion 227 to the bottom portion 228 of nozzle enclosure 220 forms a lip portion 226 that is configured to support the nozzle frame 205. Preferably, the nozzle frame 205 is secured to the nozzle enclosure 220 using the screws 225 which then extend into the deck 120 to secure the entire nozzle assembly. Of course, other types of mounting devices can be used to secure the nozzle frame 205 to the nozzle enclosure 220. In addition, while FIG. 2B shown a fastening configuration (e.g., screws 225) that secures both the nozzle frame 205 to the nozzle enclosure 220 and the nozzle enclosure 220 to the deck 120, the means to secure the nozzle frame 205 to the nozzle enclosure 220 can be different from the means to mount the nozzle enclosure 220 to the deck 120. For example, screws, bolts and/or other fasteners can be used to secure the nozzle enclosure 220 to the nozzle frame 205 while other types of mounting devices (e.g., screws, bolts and/or other fasteners) are used to mount the nozzle enclosure 220 to the deck 120. The direction of the securing means is not limiting. For example, while FIG. 2B shows a configuration in which the screws are inserted from the top, the fastening devices (e.g., screws, bolts and/or other fasteners) can be inserted from the bottom (e.g., bottom of lip 226), from the sides, or any combination of top, bottom and side. For example, as seen in FIG. 2F, nozzle frame 205' can be attached to nozzle enclosure 220 using bolts 250 that extends through slots or holes 252 (see FIGS. 2C to 2E) in nozzle frame 205'. In some embodiments, nuts 251 are threaded onto the bolts 250 after insertions into the slots or holes 252 to secure the nozzle frame 205' to the nozzle enclosure 220. Such a configuration permits the nozzle frame without having to remove the nozzle enclosure from the deck 120. In some embodiments, the bolts 250 can be permanently attached to the nozzle enclosure 220 by welding (or by using other attachment means) the bolts 250 to, for example, the bottom of the lip 226. In some embodiments, for example where the nozzle enclosure can be removed from the deck 120, the slots or holes 252 can be threaded and the bolts 250 can be threaded to the slots or holes 252. Although nozzle frame 205' is shown in FIG. 2F, nozzle frame 205 can also be attached to nozzle enclosure 220 by employing similar methods as discussed above using bolts 250.

Figure 2G:
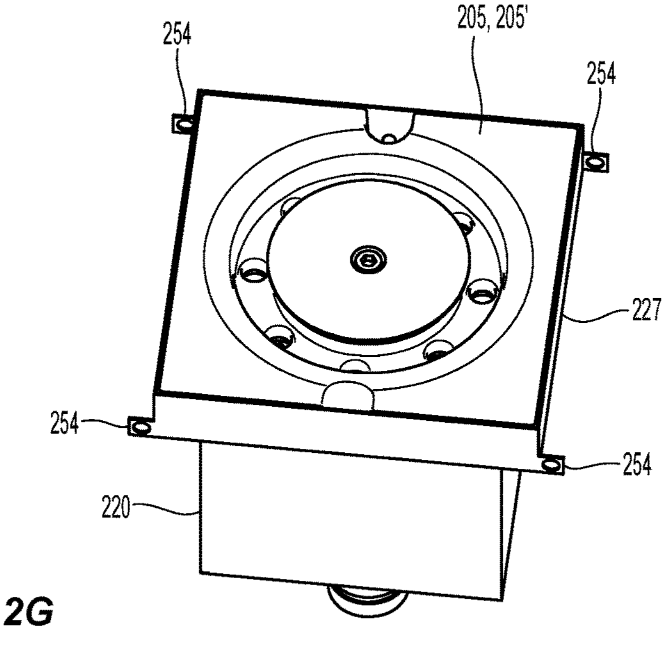
FIG. 2G illustrates a top perspective view of an embodiment of a nozzle assembly with a nozzle enclosure having tab extensions.

In addition, while FIG. 2B shows a configuration in which the screws 225 inserted from the top are used to secure the nozzle enclosure 220 to the deck 120, other methods can be used such as tab extensions from the sides of the nozzle enclosure 220 can help secure the nozzle enclosure 220 when embedded in concrete, for example. For example, FIG. 2G illustrates an embodiment where one or more tab extensions 254 extend from the top portion 227 of nozzle enclosure 220. Preferably, one or more tab extensions 254 extend from each corner of the nozzle enclosure 220. Once embedded in concentrate the tab extensions 254 can aid in securing the nozzle enclosure 220 to the deck 120.

Preferably, the cross-sectional shape of the nozzle enclosure 220 is rectangular, and more preferably square, for example, as viewed from the top. However, the cross-sectional shape of the nozzle enclosure 220 is not limiting and the nozzle enclosure 220 can have other cross-sectional shapes such as, for example, a circular shape, a trapezoidal shape, a triangular shape, or some other appropriate polygonal shape. The cross-sectional shape of the nozzle enclosure 220 preferably conforms to the cross-sectional shape of the nozzle frame 205. For example, if the nozzle frame 205 has a rectangular cross-sectional shape, the cross-sectional shape of the top portion 227 of the nozzle enclosure 220 can be rectangular. In some embodiments, the cross-sectional shapes of the nozzle frame 205 and nozzle enclosure 220 do not match. In some embodiments, the cross-sectional shape of the bottom portion 228 of the nozzle enclosure 220, for example, as viewed from the bottom, is the same as the cross-sectional shape of the top portion 227, for example, as viewed from the top. In other embodiments, the cross-sectional shape of the bottom portion 228 of the nozzle enclosure 220 is not the same as the cross-sectional shape of the top portion 227. For example, the cross-sectional shape of the top portion 227 can be a rectangle and the cross-sectional shape of the bottom portion 228 can be circular, e.g., the bottom portion 228 can be a cylinder shape.

In some embodiments, the nozzle enclosure 205 can also enclose an extension pipe 230 connected to the nozzle 28 via coupling 232. The extension pipe 230 can extend through the bottom of the nozzle enclosure 220 for connection to the piping that supplies the fire suppression fluid. Preferably, the nozzle enclosure 220 includes a seal 226 to seal the exit point of the extension pipe 230. The seal 226 can be made of a material that ensures fluids do not leak from the nozzle enclosure 220 at the point the extension pipe 230 exits the nozzle enclosure 220. For example, the seal 226 can be made of a resilient material such as, for example, rubber. Preferably, the nozzle enclosure 220 can include a drain fitting 208 for automatically and/or manually draining fluids collected in the nozzle enclosure 220.

The nozzle frame 220 can be made of any appropriate material such as, for example a metal (e.g., ductile iron, aluminum, stainless steel), a ceramic, a composite material, or a combination thereof. In exemplary embodiments, the nozzle frame 220 can be fixedly attached to the deck 120 (e.g., embedded in concrete for concrete decks, welded/bolted for metal decks, or some other appropriate fastening method).

Figure 3B:
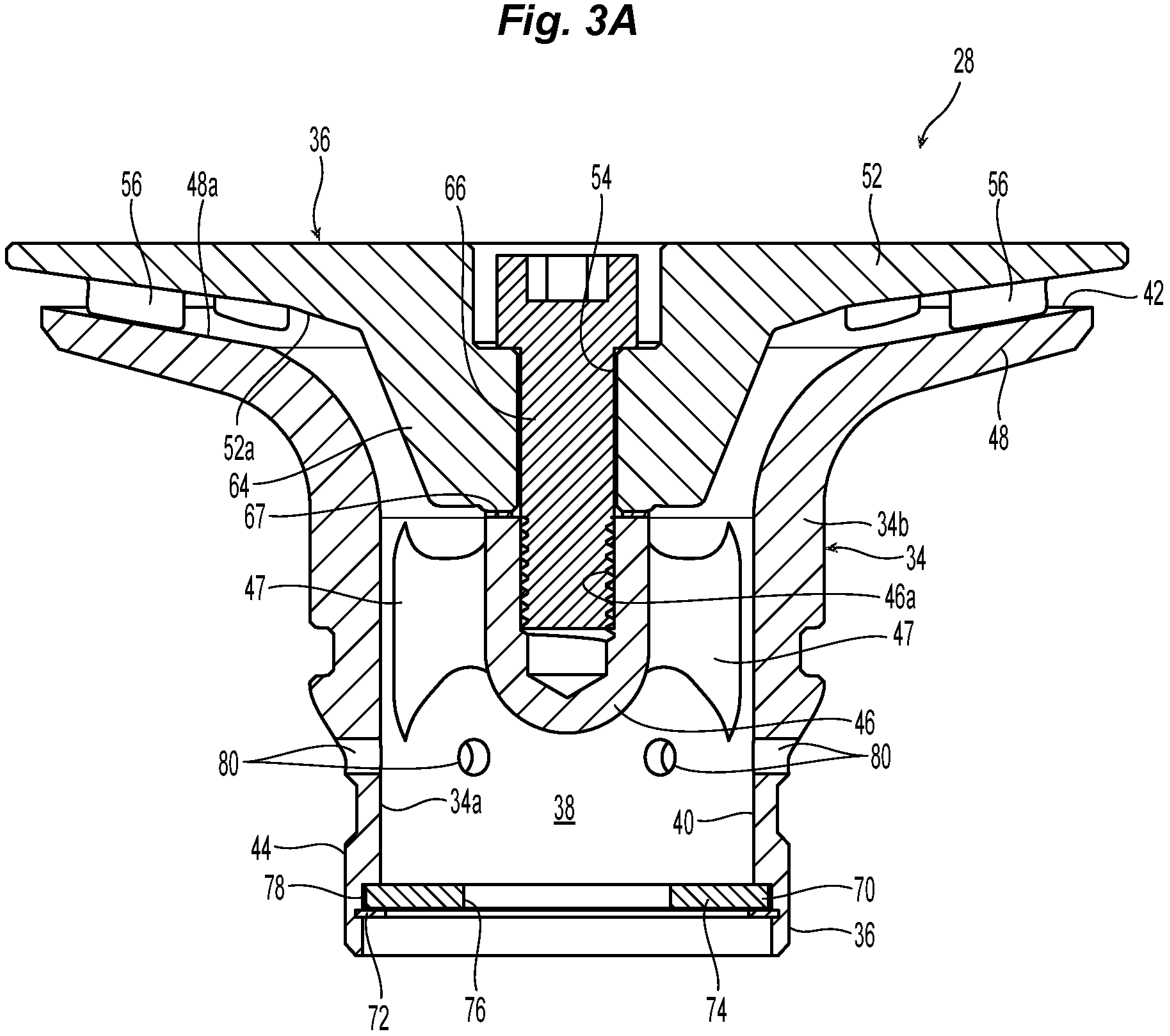
FIG. 3B illustrates is a cross-section view of the nozzle of FIG. 3A.
Figure 3D:
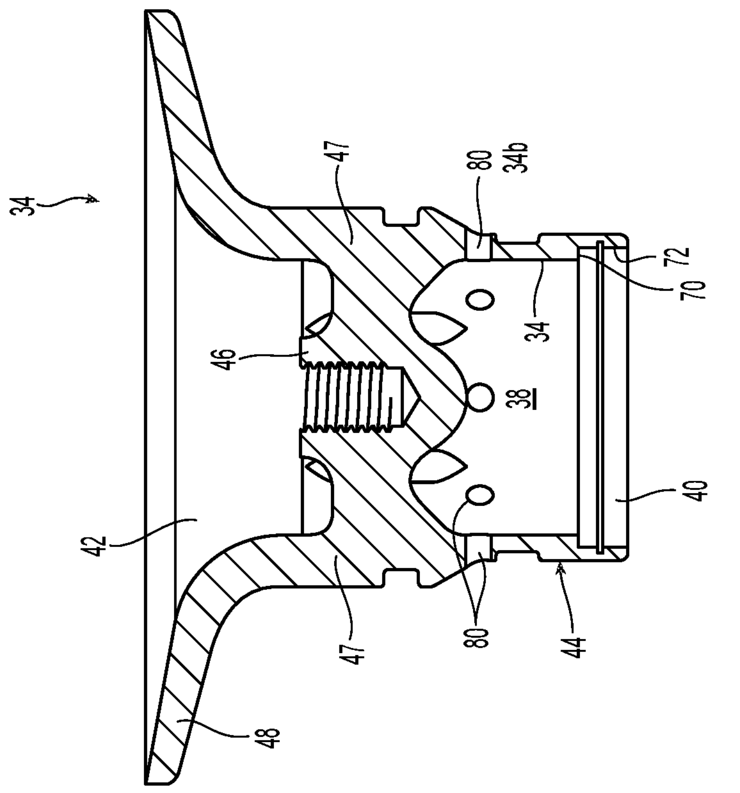
FIG. 3D illustrates a cross-sectional view of the body portion of the nozzle of FIG. 3A.
Figure 3C:
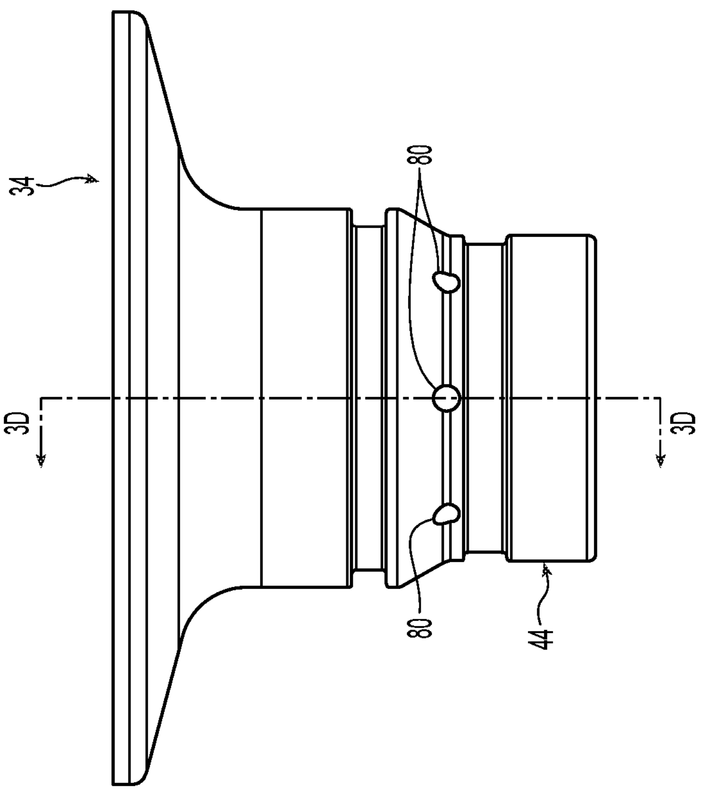
FIG. 3C illustrates side view of the body portion of the nozzle of FIG. 3A.

As discussed above, the fire suppression nozzle assembly 130 can include a nozzle 28, which is described with reference to FIGS. 3A-3D. FIG. 3A is a top view of the nozzle 28 and FIG. 3B is a cross-section view of the nozzle 28 that does not intersect radially extending web 47. FIG. 3C is side view of the body portion 34 and FIG. 3D is a cross-sectional view of the body portion 34 that intersects radially extending web 47. The nozzle 28 can be made of any appropriate material such as, for example, a metal (aluminum, stainless steel), a plastic, a ceramic, a composite material, or a combination thereof. In some embodiments, the nozzle 28 is made of stainless steel. As seen in FIGS. 3A-3D, the nozzle 28 includes a body portion 34 and a deflector portion 36 that can be supported on the body 34. A diameter of the nozzle 28 at the deflector portion can be in a range of 4 inches to 8 inches and, preferably 6 inches. A height of the nozzle from the inlet to the top of the deflector portion can be in a range of 2.5 inches to 4.5 inches and, preferably 3.75 inches. When installed in the nozzle frame 205, the top surface of deflector portion 36 lies generally flush with the surface of the deck 120. As shown in FIGS. 3A-3D, the body portion 34 defines a passage 38 extending in a longitudinal direction of the nozzle 28. The passage 38 an inlet opening 40 at an end of the passage 38 and an outlet opening 42 at an opposite end of the passage 38. The body portion 34 preferably includes a coupling portion 44 that is configured to couple to a pipe such as, for example, extension pipe 230 or supply pipe 30 (see FIG. 5B). The coupling portion 44 can be configured to couple to any standard pipe size such as, for example, a 2-inch pipe. Coupling portion 44 can be coupled to extension pipe 230 or supply pipe 30 using, for example, a threaded or grooved fitting (e.g., coupling 232). The body portion 34 can include a central support 46 that can be anchored within the passage 38 by one or more radially extending webs 47. In some embodiments, the central support 46 and/or the radially extending webs 47 are integral to the body portion 34. In some embodiments, the central support 46 and/or the radially extending webs 47 are separate components that are attached (fixedly or detachably) to the body portion 34.

Body portion 34 preferably includes a body flange 48 whose inner surface preferably defines the outlet opening 42 of passage 38. In some embodiments, the outer part of body flange 48 is configured to support the nozzle 28 when installed in, for example, the through-passage 210 of the nozzle frame 205.

Deflector portion 36 preferably includes a deflector flange 52 which is spaced from outlet opening 42 by a predetermined distance, when the nozzle 28 is assembled. As explained below, the predetermined distance is based on the height of projecting members 56. Deflector portion 36 can be substantially solid except for a central mounting opening 54 and is, therefore, substantially impervious and can provide a solid deflecting surface for the fire suppression fluid. To further deflect and, moreover, direct the fire suppression fluid, deflector portion 36 includes one or more projecting members 56 which extend from lower surface 52*a* of deflector flange 52. When the nozzle 28 is assembled, the projecting members 56 preferably rest on upper surface 48*a* of body flange 48. Preferably, the lower surface 56*a*, upper surface 48*a*, and the projecting members 56 define one or more radial passageways 88 through which the fire suppression fluid flows to form a radial spray pattern and exits the nozzle 28 is a generally lateral direction. The pattern can be a radial spray pattern in a range that is greater than 0 deg. and up to 360 deg. For example, the radial spray pattern can 90 deg., 180 deg., 360 deg., or some other value. By resting on body flange 48, projecting members 56 provide uniform support to deflector 36. Preferably, the height of the projecting members 56 are in a range of 0.125 to 0.250 inch. In some embodiments, the height of the projecting members 56 is 0.196 inch or greater, which allows for smaller particles in the fire suppression fluid to pass through the nozzle 28 without plugging the nozzle 28. In addition, having projecting members 56 that are 0.196 inch or greater allows for the filter screen (not shown) in the fire suppression fluid supply system to be ⅛-inch mesh or greater. A bigger mesh size means less maintenance and greater reliability for the fire suppression system.

Deflector portion 36 is preferably detachably coupled to the body portion 34. For example, deflector portion 36 can be coupled to the central support 46 of body portion 34 by using threaded fastener 66 (or some other type of fastener). The threaded fastener 66 preferably extends through central opening 54 of web portion 64 to threadedly engage central opening 46*a* of central support 46. Preferably, web portion 64 is shaped to minimize pressure or head loss (e.g., due to friction) of the fire suppression fluid exiting from outlet opening 42. Preferably, a resilient washer material 67 may be placed between the web portion 64 and central support 46 to prevent rotation of deflector 36 due to, for example, human contact, vibration, torque loads that may be caused by vehicles, or some other factor that could loosen the deflector portion 36 from the body portion 34. However, the resilient washer material 67 preferably breaks free to permit rotation to prevent damage to nozzle 28 in the event that the nozzle 28 is subject to heavy torque loads caused by, for example, turning or accelerating vehicles.

In the illustrated embodiment, central support 46 is preferably centrally located in body 34 and/or in passage 38. The central support 46 is preferably supported in passage 38 by one or more radial arms 47. For example, the illustrated embodiment, the central support 46 is supported by six radial arms 47. Those skilled in the art understand, however, that the number of radial arms may be modified and can be greater or less than six. Radial arms 47 extend from central support 46 to an inner surface 34*a* of body wall 34*b* of the body portion 34 (FIG. 3A). Central support 46 is preferably shaped to minimize pressure or head loss (e.g., due to friction) of the fire suppression fluid flowing through passage 38. However, in some embodiments, the central support 46 and the radial arms 47 are configured to introduce some turbulence in the flow of the fire suppression fluid so as to facilitate aeration of the fire suppression fluid via air holes or apertures 80 (discussed below).

The inlet end 40 of the inner surface 34*a* of the body wall 34*b* is provided with a shoulder 70 and a recessed groove 72. A restrictor plate 74 having an aperture 76 is disposed against the shoulder 70 and is retained in place by a clip 78 received in the recessed groove 72. The size of the aperture 76 is selected based on the desired or required K-factor for the fire suppression nozzle 28. The aperture 76 also provides a venturi effect in the passage 38 that aids in aerating the fire suppression fluid.

In some embodiments, one or more air holes or apertures 80 are provided in the body wall 34*b* of the body portion 34. Preferably, the number of air holes or apertures 80 is in a range of 1 to 10, preferably in a range of 3 to 8, and more preferably 6. Due to the venturi effect in the passage 38, the air from outside the nozzle 28 flows through the air holes or apertures 80 to aerate the fire suppression agent. The aeration of the fire suppression agent facilitates the foam formation when the fire suppression agent is discharged onto the fire suppression target area 120. Preferably, the inner surface 34*a* of the body wall 34*b* is cylindrical in shape. In some embodiments, the diameter of each of the air holes or apertures 80 is 0.125±0.0125 inch. Preferably, the total cross-sectional area of the air holes or apertures 80 is in a range of 0.025 $in^2$ to 0.5 $in^2$, and preferably 0.167 $in^2$. While exemplary embodiments of the present technology are illustrated with the body portion 34 having aperture 80, other exemplary embodiments of the present technology do not include aperture 80.

FIGS. 4A and 4B illustrate bottom and side views, respectively, of deflector portion 36. As best seen in FIG. 4A, projecting members 56 are aligned along lines extending radially outward from the center of deflector portion 36 and rest upon central support 46 when assembled. Projecting members 56 are preferably spaced to provide multiple spray jets close together, with each spray jet providing a high velocity foam or water solution that causes multiple droplets sizes and effects the adjacent spray tooth. Projecting members 56 preferably include a pair of arcuate side surfaces 56*a* that converge to a point 56*b*, 56*c* at a radially inner end and a radially outer end of the projecting member 56. Each projecting member 56 includes a planar bearing surface 84 for resting on body flange 48 and the arcuate side surfaces 56*a* define passageways 88 therebetween. The arcuate side surfaces 56*a* of the projecting members 56 produce a venturi effect in the passageway 88 between each projecting member 56, which pulls the fire suppression pattern together to form a uniform distribution, e.g., a solid pattern (e.g., no gaps). The venturi effect from the projecting members 56 also creates multiple fire suppression fluid droplet sizes and velocities, which creates a uniform distribution of the water or foam solution. Preferably, projecting members 56 are fixed (e.g., by casting) to a lower surface 52*a* of flange 52 (see FIG. 3B).

Nozzles 28 are sized for application to a protected area using a "K" factor which is dependent on the inlet supply pressure to each nozzle and the size of the aperture 76 in the restrictor plate. The flow rate is determined by the available pressure to each nozzle using an industry standard formula. Flow in GPM="K"×(Pressure (PSI)$^{1/2}$. The flow rate of nozzle 28 is designed to provide an application density of at least a 0.1 GPM per square-foot over an area of coverage. Preferably the "K" factor of nozzle 28 has a range of about 25-50 feet.

From the foregoing description, those skilled in the art understand that nozzle 28 has no moving parts. In addition, because deflector 36 is supported by projecting members 56 and center support 46 of body portion 34, those skilled in the art understand that deflector 36 has uniform support at its outer edge which results in deflector 36 being able to accept heavy vertical weight. For example, in exemplary embodiments, the nozzle 28 can withstand up to 350 psi on the top of the nozzle 28.

Referring to FIG. 3B, inner surface 52*a* of deflector flange 52 is angled to radially direct the flow of the fire suppressant in a manner to maintain a maximum lateral trajectory and, further, to minimize the height of the spray from the deck area. Preferably, a trajectory of the fire suppression fluid has a low discharge angle with respect to the surface of the deck (e.g., less than 45-deg. angle). In some embodiments, the maximum height h (see FIG. 1A) of the spray can be in a range of about 12 inches to 18 inches and, more preferably, less than 12 inches. In some embodiments, inner surface 52*a* of flange 52 is angled in a range of 10 to 15 degrees from horizontal (as used herein horizontal refers to the upper or top surface of deflector portion 36), more preferably approximately 10 degrees from horizontal so that the spray has a lateral coverage distance of approximately 5 feet to 30 feet. For example, typical "K" factors covered by nozzle 28 can range from 14 feet diameter for 180-degree pattern to 50 feet diameter for a 360-degree pattern. Preferably, the desired "K" factor is constant over a range of inlet pressures from about 40 psi to 100 psi.

The web portion 64 on the deflector portion 52 preferably includes one or more vanes 90 extending radially outward therefrom. As shown in FIGS. 4A-4C, preferably, eight vanes 90 are evenly spaced at 45-degree intervals around the web portion 64. However, the number of vanes and the spacing between the vanes can vary from the illustrated embodiments. The vanes 90 are pointed in the inner and outer directions to facilitate the flow of the fire suppression fluid and minimize pressure or head loss.

In some exemplary embodiments, the nozzle 28 can be installed in a floor grating covering a trench, if desired. For example, as seen in FIGS. 5A and 5B, floor fire suppressant system 12 includes a grate-type fire suppression nozzle assembly 10 that is configured for positioning in a trench 14 of a deck area, which can be, for example, a helipad deck area. The nozzle assembly 10 includes a spray-type nozzle 28 and a nozzle frame 22. In some embodiments, as sown in FIG. 1B, the nozzle assembly 10 includes a nozzle grate 24 that is adjacent to and integral to the nozzle frame 22 such that the nozzle frame 22 and nozzle grate 24 are one integral unit. In some embodiments, the nozzle frame 22 can be attached to and/or installed adjacent to grate 20, which can be conventional floor grating.

As best seen in FIG. 5B, trench 14 extends below floor surface 16 and includes shelves or support surfaces 18 for supporting thereon floor grating 20 and/or nozzle grate 24 and nozzle frame 22 (FIG. 5B). In some embodiments, grating 20 may be of conventional design with a plurality of drain openings 21 extending therethrough to permit fire suppressant run off and debris to drain from the floor area. Nozzle frame 22 is designed to support a nozzle 28 of the present disclosure in a manner similar to nozzle frame 205, but nozzle frame 22 is configured for installation in trenches. That is, while nozzle frame 205 can be installed in decks that may or may not have trenches, other embodiments of the nozzle frame such as, for example, nozzle frame 22 (in combination with nozzle grate 24 and/or grating 20 are configured to facilitate installation in decks that have trenches. Preferably, nozzle grating 22 can support a nozzle 28 of the present disclosure in a manner to permit nozzle 28 to deliver fire suppression fluid to the fire suppression target area unhampered by aircraft, equipment or other potential obstructions, as described above. In the embodiment of FIGS. 5A and 5B, a fire suppression fluid supply pipe 30 is connected to the nozzle 28 by a grooved coupler 32, although other types of connections can be used. The supply pipe 30 can be connected to the fire suppression system 100 discussed above to supply the fire suppression fluid.

As seen in FIG. 5B, nozzle grating 22 includes a through-passage (similar to through-passage 210) for accepting the nozzle 28. The through-passage includes an annular tapered support surface on which body flange 48 of the body portion 34 can rest. When installed in the through-passage of the nozzle grating 22, the body flange 48 supports the nozzle 28. Body flange 48 is preferably angled to match tapered surface of the through-passage so that there is uniform support for body flange 48 by nozzle grating 22. Those skilled in the art will understand that operation of the nozzle 28 when installed in the nozzle grating 22 is similar to operation of the nozzle 28 in nozzle assembly 130 discussed above. Accordingly, for brevity, operation of the nozzle 28 in the grating 22 will not be further discussed.

Nozzle 28 in the above exemplary embodiments provides a 360-deg. radial spray pattern. However, exemplary embodiments of the present invention can have fire suppression nozzles that have a radial spray pattern that is less than 360 degrees. For example, FIGS. 6A-6E illustrate an embodiment of the fire suppression nozzle that has a 90-deg. radial spray pattern. FIG. 6A is a top view of the nozzle 120 and FIG. 6B is a cross-sectional view of the nozzle 128. The nozzle 128 can be used to spray fire suppression fluid in, for example, a corner of the deck 120. As seen in FIG. 6B, the body portion 34 of the nozzle 128 is the same as the body portion 34 of the nozzle 28. Accordingly, for brevity, a detailed description of the body portion 34 of the nozzle 128 is omitted. As seen in FIG. 6B, the deflector portion 136 of nozzle 128 is different from that of deflector 36 of nozzle 28.

FIG. 6C illustrates a bottom view of deflector portion 136 and FIG. 6D illustrates a cross-sectional view of deflector portion 136. FIG. 6E illustrates a front view of deflector portion 136 and FIG. 6F illustrates a side view of deflector portion 136. With reference to FIGS. 6A-6F, the deflector portion 136 is configured to direct a fire suppression fluid in a generally 90° pattern. The deflector portion 136 includes a channel 140, which can be, for example, V-shaped, U-shaped, a rectangular groove, or some other shape that facilitates insertion of a resilient sealing member that is made of, for example, rubber or some other resilient and/or elastic material. The channel 140 receives the resilient sealing member 142, which can be, for example, an O-ring that has been split. When the nozzle 128 is assembled, the resilient sealing member 142 is disposed and pressed between a segment of the deflector portion 136 and the body flange 48 of the body portion 34 to seal the segment. The channel 140 and resilient sealing member 142 extend circumferentially around approximately 270 degrees of the deflector portion 136 with respect to a central axis of the defector portion 136 to provide a 90-deg. radial spray pattern between the ends thereof. The deflector portion 136 can include one or more projecting members 156 extending from the deflector flange 152. The deflector portion 136 can also include a web portion 164 and one or more vanes 190 extending from the web portion 164. For example, in the illustrated embodiment, two projecting members 156 and three vanes 190 are shown. Of course, number and spacing of the projecting members 156 and/or vanes 190 are not limiting each can be more or less than that shown in the illustrated embodiments. Those skilled in the art will understand that the functions and configurations of projecting members 156, web portion 164, and vanes 190 are similar to the functions and configurations of projecting members 56, web portion 64, and vanes 90 discussed above with respect to nozzle 28. Accordingly, for brevity, a detailed description of projecting members 156, web portion 164, and vanes 190 is omitted.

FIGS. 7A to 7D are directed to an embodiment of the fire suppression nozzle that has a 180-deg. radial spray pattern. FIG. 7A illustrates a top view of the nozzle 228. The body portion of the nozzle 228 is the same as the body portion 34 of the nozzle 28. Accordingly, for brevity, a detailed description of the body portion of the nozzle 228 is omitted. With respect to the deflector portion, FIG. 7B illustrates a front view of the deflector portion 236, FIG. 7C illustrates a bottom view of the deflector portion 236, and FIG. 7D illustrates a cross-sectional view of the deflector portion 236. The nozzle 228 can be used to spray fire suppression fluid in, for example, a side of the deck 120.

With reference to FIGS. 7B-7D, the deflector portion 236 is configured to direct a fire suppression fluid in a generally 180° pattern. The deflector portion 236 includes a channel 240, which can be, for example, V-shaped, U-shaped, a rectangular groove, or some other shape that facilitates insertion of a resilient sealing member that is made of, for example, rubber or some other resilient and/or elastic material. The channel 240 receives the resilient sealing member 242, which can be, for example, an O-ring that has been split. When the nozzle 228 is assembled, the resilient sealing member 242 is disposed and pressed between a segment of the deflector portion 236 and the body flange of the body portion of the nozzle 228 to seal the segment. The channel 240 and resilient sealing member 242 extend circumferentially around approximately 180 degrees of the deflector portion 236 with respect to a central axis of the defector portion 236 to provide a 180-deg. radial spray pattern between the ends thereof. The deflector portion 236 can include one or more projecting members 256 extending from the deflector flange 252. The deflector portion 236 can also include a web portion 264 and one or more vanes 290 extending from the web portion 264. For example, in the illustrated embodiment, five projecting members 256 and five vanes 290 are shown. Of course, number and spacing of the projecting members 256 and/or vanes 290 are not limiting each can be more or less than that shown in the illustrated embodiments. Those skilled in the art will understand that the functions and configurations of projecting members 256, web portion 264, and vanes 290 are similar to the functions and configurations of projecting members 56, web portion 64, and vanes 90 discussed above with respect to nozzle 28. Accordingly, for brevity, a detailed description of projecting members 256, web portion 264, and vanes 290 is omitted.

Numerous specific details in the exemplary embodiments are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). As used herein, including in the claims, "and" as used in a list of items (for example, a list of items prefaced by a phrase such as "at least one of" or "one or more of") indicates an inclusive list such that, for example, a list of at least one of A, B, and C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fire suppression nozzle assembly, comprising:

a spray nozzle for spraying a fire suppression agent, the spray nozzle including, a body portion defining a passage extending longitudinally through the body portion for conveying the fire suppression agent, and a deflector portion coupled to the body portion, wherein the deflector portion includes a top surface, a flange, and a plurality of projecting members for supporting the flange above the body portion at a predetermined height to form radial passageways configured to spray the fire suppression agent onto a fire suppression target area using a radial spray pattern;

a nozzle frame having a top surface and a through-passage, the body portion of the spray nozzle positioned within the through-passage such that the top surface of the deflector portion is flush with the top surface of the nozzle frame; and a nozzle enclosure for enclosing the spray nozzle and the nozzle frame and configured for installation in a surface made of an impervious material, the nozzle enclosure having a top portion surrounding the nozzle frame and a lip portion that supports the nozzle frame within the nozzle enclosure.

2. The nozzle assembly of claim 1, wherein the nozzle enclosure configured to enclose the nozzle frame further comprises a terminal end of the top portion of the nozzle enclosure flush with the top surface of the nozzle frame.

3. The nozzle assembly of claim 2, wherein a top portion of the nozzle frame has a width that is less than a width of a bottom portion of the nozzle frame.

4. The nozzle assembly of claim 2, wherein a width of the nozzle frame is less than a width of an inside portion of the nozzle enclosure such that a perimeter spacing exists between the nozzle frame and the nozzle enclosure.

5. The nozzle assembly of claim 2, wherein the nozzle enclosure includes one or more tab extensions extending from a corner of the nozzle enclosure, the one or more tab extensions to aid in securing the nozzle enclosure to the surface made of the impervious material.

6. The nozzle assembly of claim 1, wherein the nozzle frame includes at least one drainage hole for draining fluids from the surface, and wherein the nozzle enclosure includes a bottom portion that collects the fluids from the surface.

7. The nozzle assembly of claim 6, wherein a transition from the top portion to the bottom portion forms the lip portion.

8. The nozzle assembly of claim 6, wherein the at least one drainage hole comprises a plurality of drainage holes that circumscribe the through-pass age of the nozzle frame.

9. The nozzle assembly of claim 1, wherein a portion of the body portion at an inlet of the passage includes a plurality of apertures extending therethrough for aerating the fire suppression agent;

wherein a restrictor plate is disposed at the inlet of the passage, the restrictor plate having an aperture extending therethrough, the restrictor plate provides a venturi effect in the passage that facilitates the aeration of the fire suppression agent;

wherein the body portion includes a central support disposed in the passage, the central support having a plurality of radial arms that are attached to an inner wall of the body portion, wherein the radial arms introduce turbulence in a flow of the fire suppression agent so as to facilitate the aeration of the fire suppression agent;

wherein the projecting members have a pair of arcuate sidewalls that converge to a point in a radially inner end and a radially outer end of the projecting members; and wherein the deflector portion includes a web portion for coupling to the body portion, the web portion having a plurality of vanes extending radially therefrom at spaced locations.

10. The nozzle assembly of claim 1, wherein a bottom portion of the nozzle frame has a width that is less than a width of a top portion of the nozzle frame.

11. The nozzle assembly of claim 1, wherein a width of the nozzle frame is same as a width of an inside portion of the nozzle enclosure such that no perimeter spacing exists between the nozzle frame and the nozzle enclosure.

12. The nozzle assembly of claim 1, further comprising an extension pipe coupled to the spray nozzle that extends through a bottom portion of the nozzle enclosure at an exit point, and a seal that seals the exit point of the extension pipe.

13. The nozzle assembly of claim 12, wherein the bottom portion of the nozzle enclosure includes a drain fitting.

14. A fire suppression nozzle assembly, comprising:

a spray nozzle for spraying a fire suppression agent, the spray nozzle including, a body portion defining a passage extending longitudinally through the body portion for conveying the fire suppression agent, and a deflector portion coupled to the body portion and configured to spray the fire suppression agent onto a fire suppression target area using a radial spray pattern;

a nozzle frame having a through-passage, the body portion of the spray nozzle positioned within the through-passage; and a nozzle enclosure for enclosing the spray nozzle and the nozzle frame and configured for installation in a surface made of an impervious material, the nozzle enclosure having a top portion surrounding the nozzle frame, wherein a terminal end of the top portion is flush with a top surface of the nozzle frame.

15. The nozzle assembly of claim 14, wherein the nozzle enclosure includes a lip portion that supports the nozzle frame within the nozzle enclosure.

16. The nozzle assembly of claim 14, wherein a top surface of the deflector portion is flush with a top surface of the nozzle frame.

17. The nozzle assembly of claim 14, wherein a top surface of the deflector portion remains flush with the surface during operation of the spray nozzle.

18. The nozzle assembly of claim 14, wherein the terminal end of the top portion of the nozzle enclosure remains flush with the surface during operation of the spray nozzle.

19. The nozzle assembly of claim 18, wherein the deflector portion includes a top surface, a flange, and a plurality of projecting members for supporting the flange above the body portion at a predetermined height to form radial passageways.

20. The nozzle assembly of claim 18, wherein a terminal end of a top portion of the nozzle enclosure remains flush with the surface during operation of the spray nozzle.

21. A fire suppression nozzle assembly, comprising:

a spray nozzle for spraying a fire suppression agent, the spray nozzle including, a body portion defining a passage extending longitudinally through the body portion for conveying the fire suppression agent, and a deflector portion coupled to the body portion and configured to spray the fire suppression agent onto a fire suppression target area using a radial spray pattern;

a nozzle frame having a through-passage, the body portion of the spray nozzle positioned within the through-passage; and a nozzle enclosure for enclosing the spray nozzle and the nozzle frame and configured for installation in a surface made of an impervious material, wherein a top surface of the deflector portion is flush with a top surface of the nozzle frame.

* * * * *